(12) United States Patent  
Gamadia et al.

(10) Patent No.: US 8,049,811 B2  
(45) Date of Patent: Nov. 1, 2011

(54) AUTOMATIC FOCUSING APPARATUS AND METHOD FOR DIGITAL IMAGES USING AUTOMATIC FILTER SWITCHING

(75) Inventors: Mark N. Gamadia, Richardson, TX (US); Nasser Kehtarnavaz, Plano, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 330 days.

(21) Appl. No.: 12/435,818

(22) Filed: May 5, 2009

(65) Prior Publication Data

US 2010/0188558 A1 Jul. 29, 2010

Related U.S. Application Data

(60) Provisional application No. 61/148,042, filed on Jan. 28, 2009.

(51) Int. Cl.
*G03B 13/00* (2006.01)
*H04N 5/232* (2006.01)

(52) U.S. Cl. .................. 348/345; 348/349; 382/255

(58) Field of Classification Search .................. 348/345, 348/349, 354–356
See application file for complete search history.

(56) References Cited

U.S. PATENT DOCUMENTS

| | | | |
|---|---|---|---|
| 4,990,947 A | 2/1991 | Komiya et al. | |
| 5,115,262 A | 5/1992 | Komiya | |
| 5,144,450 A | 9/1992 | Kikuchi et al. | |
| 5,231,443 A | 7/1993 | Subbarao | |
| 5,260,736 A | 11/1993 | Toji | |
| 5,475,429 A | 12/1995 | Kodama | |
| 5,689,740 A | 11/1997 | Uchiyama | |
| 5,715,483 A | 2/1998 | Omata et al. | |
| 6,701,075 B2 | 3/2004 | Ogino | |
| 6,970,646 B2 | 11/2005 | Hirai | |
| 7,079,763 B2 | 7/2006 | Hirai | |
| 7,085,488 B2 | 8/2006 | Ogino | |
| 7,110,035 B1 | 9/2006 | Hellstrand | |
| 7,173,243 B1 | 2/2007 | Yang et al. | |
| 7,236,696 B2 | 6/2007 | Higuma et al. | |
| 7,389,042 B2 | 6/2008 | Lin et al. | |
| 7,783,098 B2 * | 8/2010 | Douglass et al. | 382/128 |
| 2007/0268376 A1 * | 11/2007 | Yoshikawa et al. | 348/222.1 |
| 2010/0045825 A1 * | 2/2010 | Hatori et al. | 348/241 |

OTHER PUBLICATIONS

International Search Report and Written Opinion for PCT/US2010/021276 dated Aug. 30, 2010.

* cited by examiner

*Primary Examiner* — Jordan Schwartz

(74) *Attorney, Agent, or Firm* — Daniel J. Chalker; Edwin S. Flores; Chalker Flores, LLP

(57) ABSTRACT

An apparatus and method for automatically focusing a lens of a digital imaging device, such as a digital still or video camera or camera phone, that reduces the auto focus time while not compromising image sharpness quality and simultaneously reducing device power consumption due to focus actuator movement, all without tuning or adjustment of thresholds or parameters is disclosed. The present invention automatically computes a set of digital band-pass filters matched to the imaging device specifications along with corresponding step-size magnitudes. A filter-switching search for the in-focus focus actuator position is formulated such that filters are switched and step-sizes are reduced as the search gets closer to the in-focus position by utilizing local estimates of the first and second-order differential information of the focus value surface.

34 Claims, 8 Drawing Sheets

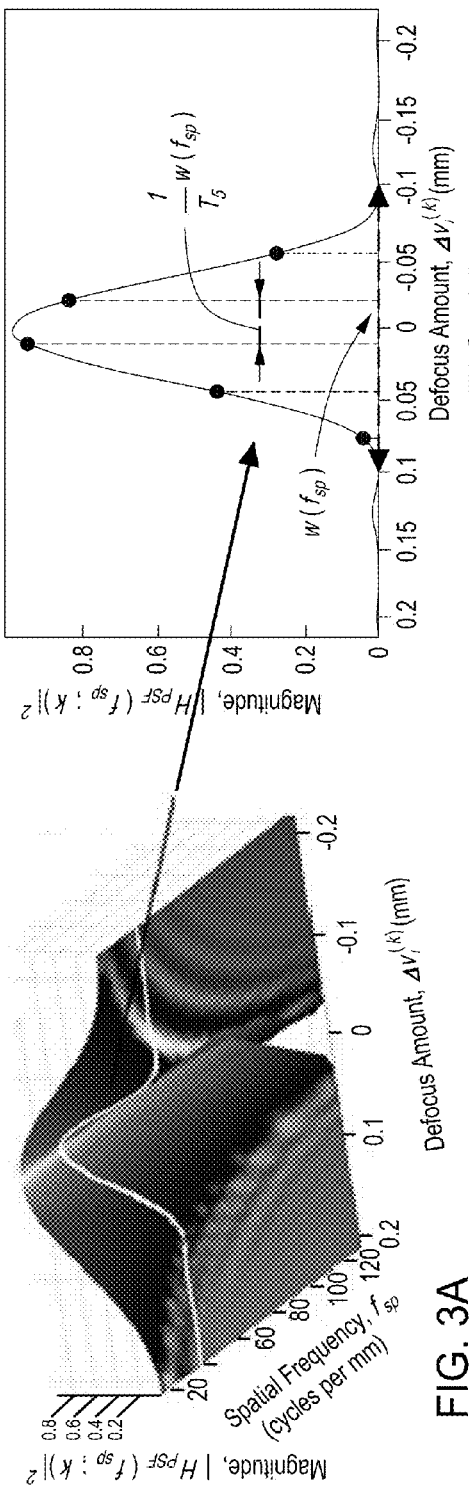
FIG. 3A
FIG. 3B
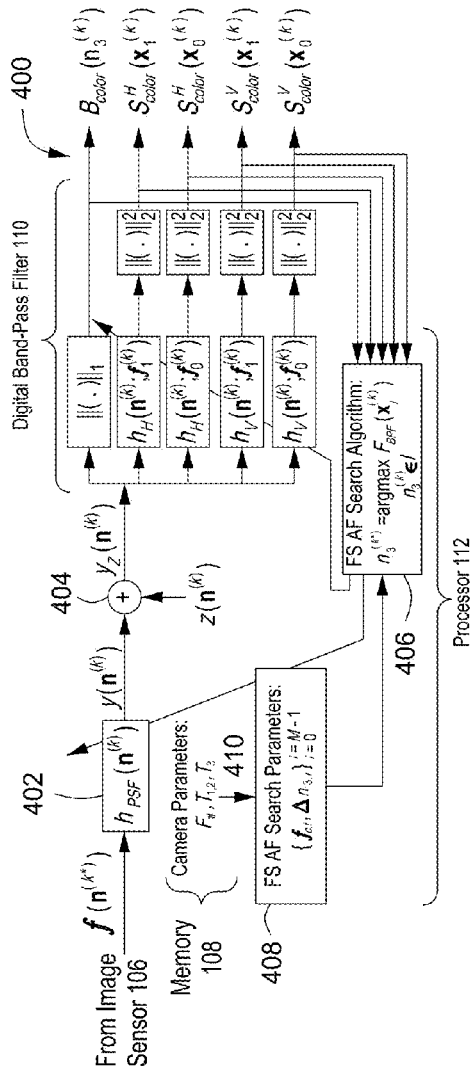
FIG. 4

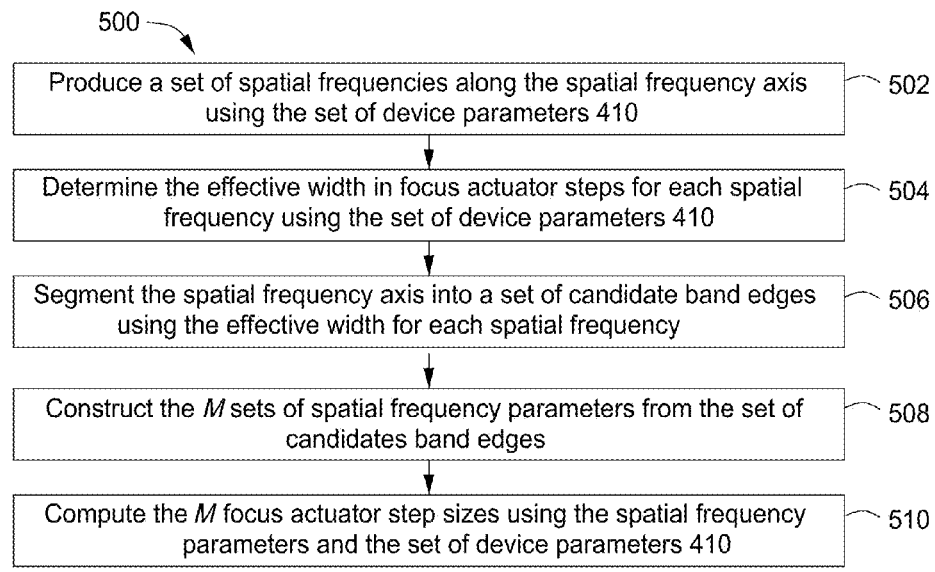
FIG. 5
FIG. 7A
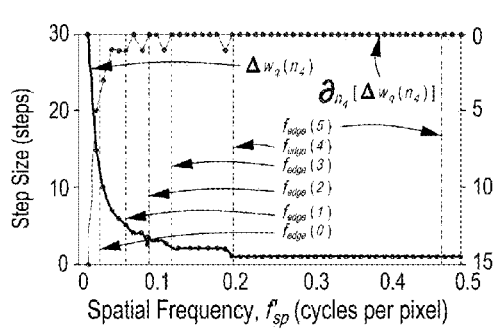
FIG. 7B
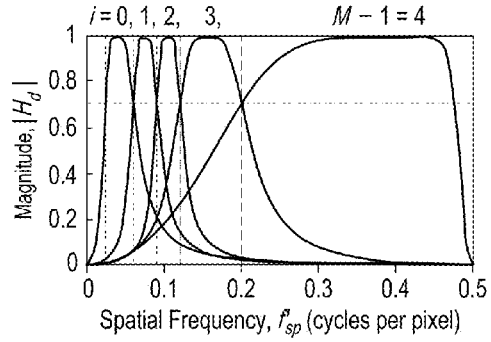
FIG. 7C
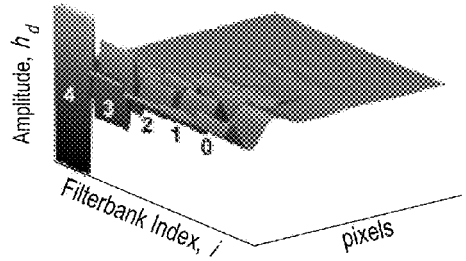
FIG. 7D
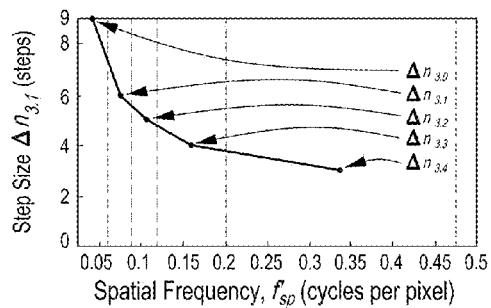

AUTOMATIC FOCUSING APPARATUS AND METHOD FOR DIGITAL IMAGES USING AUTOMATIC FILTER SWITCHING

CROSS-REFERENCE TO RELATED APPLICATIONS

This patent application is non-provisional patent application of U.S. provisional patent application Ser. No. 61/148,042 filed on Jan. 28, 2009 and entitled, "Automatic Focusing Apparatus and Method for Digital Images Using Automatic Filter Switching" which is hereby incorporated by reference in its entirety.

FIELD OF THE INVENTION

The present invention relates generally to the field of digital imaging and, more particularly, to an automatic focusing apparatus and method for digital images using automatic filter switching.

BACKGROUND OF THE INVENTION

Facilitating the automatic capturing of high quality images with little or no user intervention is the primary objective in any consumer level digital or cell-phone camera system design. Consumers often rank image sharpness as a major factor of final image quality [1]. The sharpness of the final captured image is determined in large part by the ability of the camera's auto-focus (AF) system to adjust the distance between the lens and image sensor in such a way as to render an object of interest at a certain distance from the camera onto the image sensor with an imperceptible amount of blur.

Due to its ease of hardware integration, the passive AF approach has become the defacto standard in realizing the AF feature for compact consumer digital or cell-phone camera systems. In passive AF, a measure of image sharpness is extracted from a portion of the captured image. This measure is then used to adjust the imaging distance via a search algorithm running on the camera's processor so that the extracted measure obtains a peak value [2].

There are three components to any passive AF method namely: focus region, sharpness measure, and sharpness search algorithm [3]. As far as sharpness search algorithms are concerned, several attempts have been made to determine the in-focus position quickly without overshooting or oscillating around the peak as consumers desire a smooth AF experience with minimum overshoot and no rapid oscillation between extreme levels of focus and defocus [4], [5]. The efficiency of the search depends on the number of times the distance between the lens and image sensor is adjusted to bring the image into focus.

Many different types of search approaches can be found in the literature including Global Search, Iterative Coarse-to-Fine Search, Divide-and-Conquer Search, Prediction Search, and Variable Step-Size Sequential Search. The Global Search (GS) approach sequentially searches every position in the search space, and uses the position of maximum sharpness as the in-focus position. A GS-found in-focus position provides the true in-focus position and thus can be used to compare the accuracy of other search methods. Iterative coarse-to-fine approaches include Choi's fast hopping search [6], which combines a coarse scan with GS near the estimated peak location, and Li's fixed step-size coarse search [7], which uses a fine scan near the estimated coarse peak. The divide-and-conquer approach is exemplified with the Fibbonaci [8] search. Although this search is optimal in minimizing the number of iterations for a given search space, it is not a viable method for a consumer camera AF system due to the oscillation around the peak and its inefficiency in total distance moved [4], [5]. In [9], Chen et al. presented a prediction search to forecast the turning point of the sharpness measure which helped to reduce the number of iterations. Several variable step-size search methods have been proposed for adjusting the speed of search, the key differentiator in such methods lies in how to determine the step-size. Fuzzy rule-based [10], [11] and crisp rule-based [3], [12] methods have been applied to adjust the step-size in a heuristic manner, while in [13], Batten adapted the step-size in order to keep the gradient of the sharpness measure constant. In [14], Yao used a Maximum-Likelihood statistical approach to determine thresholds in a crisp rule-based type search for the adjustment of the step-size.

In [15], Yao et al. presented a study of sharpness measures and search algorithms, where it was found that the variable step-size Rule-based Search (RS) [12] outperformed other search algorithms in terms of accuracy and convergence speed. In other words, it has been independently verified that such a sequential search is able to reduce the number of iterations and to eliminate the oscillation found in the divide-and-conquer approaches. In [3], the effectiveness of the RS approach was also confirmed and improvements were made to it, named Modified-RS (MRS), that achieved better performance than the original RS.

The existing sharpness search algorithms presented in the literature, including RS and MRS, are performed based on user-defined thresholds, rules, and step-size magnitudes. However, since the sharpness measure depends on many factors including the optics, the sensor, the object of interest and its surrounding environment, it becomes difficult to tune such thresholds to control the adjustment of the step-size to achieve an efficient search across different camera platforms.

Furthermore, in the digital band-pass filter sharpness measure method that is popular with camera manufacturers, the choice of filter pass-band is somewhat arbitrary. Only general recommendations have been mentioned in the literature such as using a low-frequency band at the initial searching stage and then using a higher-frequency band to accurately locate the peak [16]. It is not mentioned how the pass-band should be changed when changing the camera optics and sensor.

Thus, from a camera manufacturer's point of view, it is desirable to parameterize the passive AF system so that it becomes portable across many different camera platforms. The existing AF algorithms, however, do not adequately address how to properly set the AF parameters, such as the filter pass-band and the step-size magnitude. Accordingly, there is a need for AF method and system that automatically derives the passive AF parameters, reduces the number of iterations and lowers the auto focusing time while not compromising sharpness quality.

SUMMARY OF THE INVENTION

The present invention provides an automatic focusing apparatus and method for digital images that automatically derives the passive AF parameters based on camera specifications, and uses the derived AF parameters in a Filter-Switching Search (FS) that reduces the number of iterations and lowers the auto focusing time while not compromising sharpness quality. The passive AF parameters are automatically derived based on the camera specifications including the lens F-number, the sensor's pixel pitch, and the focus actuator's step resolution. The derived parameters also include an optimum bank of digital band-pass filters matched to the camera specifications along with their corresponding step-size magnitudes.

The Filter-Switching Search (FS) takes advantage of the derived parameters to realize a self-tuning passive AF system where filters are switched and step-sizes are reduced as the search gets closer to the in-focus position by using local estimates of the first and second derivatives of the focus value surface. Such a formulation provides a means to automatically achieve a balance between AF speed and AF accuracy without extensive tuning or adjustment of difficult-to-set thresholds or parameters. In order to gauge the performance of passive AF systems, an experimental methodology is presented to standardize the performance testing of passive AF algorithms in terms of different light and contrast levels. By applying the developed framework on three different camera systems, it is demonstrated that the Filter-Switching Search (FS) outperforms the existing methods while requiring no or little parameter tuning/adjustment. The present invention can be used for AF systems in any digital imaging device, such as digital cameras (still or video), cell-phone cameras, computer cameras, personal data assistants (PDA), mobile communication devices, hand-held devices, vehicles, etc.

The present invention provides an automatic focusing apparatus that includes a focusing lens, a focus actuator connected to the focusing lens to move the focusing lens, an image sensor aligned with the focusing lens to detect an image through the focusing lens, and a memory storing a set of device parameters. The image sensor provides a noise-free, blurred, Bayer-pattern sampled image within a focus window from the detected image to the j digital band-pass filters connected to the image sensor to extract a set of sharpness samples from the noise-free, blurred, Bayer-pattern sampled image wherein j>=2. Furthermore, the apparatus includes a processor connected to the focus actuator, the digital band-pass filters and the memory. The processor (a) generates M sets of spatial frequency parameters and M focus actuator step sizes using the set of device parameters wherein M is a number of segments of a spatial frequency axis, and with i=1 (b) loads the i to i+j sets of spatial frequency parameters into the digital band-pass filters (c) obtains a matrix of focus value samples from the digital band-pass filters, (d) controls the focus actuator to sample a local surface behavior using the i focus actuator step size, (e) repeats steps (b) to (d) with i=i+1 whenever a switch condition is satisfied, and (f) estimates a final in-focus position for the image and controls the focusing lens to move to the final in-focus position whenever a stop condition is satisfied.

In addition, the present invention provides a method for automatically focusing a focusing lens using j digital band-pass filters wherein j>=2 by (a) generating M sets of spatial frequency parameters and M focus actuator step sizes using a set of device parameters wherein M is a number of segments of a spatial frequency axis, and with i=1, and (b) loading the i to i+j sets of spatial frequency parameters into the digital band-pass filters. Next, (c) a matrix of focus value samples is obtained from the digital band-pass filters, and (d) the focusing lens is controlled to sample a local surface behavior using the i focus actuator step size. Steps (b) to (d) are then repeated with i=i+1 whenever a switch condition is satisfied. Thereafter, (f) a final in-focus position is estimated for the image and the focusing lens controlled to move to the final in-focus position whenever a stop condition is satisfied. This method can be implemented by a computer readable medium encoded with a computer program wherein the steps are performed by one or more code segments.

Moreover, the present invention provides an automatic focusing apparatus and method in which M sets of spatial frequency parameters and M focus actuator step sizes are generated using the set of device parameters. The first and second sets of spatial frequency parameters are loaded into the first and second digital band-pass filters, respectively. The iteration k is initialized. If the stop condition is satisfied, the final in-focus position is estimated and the focusing lens is controlled to move to the final in-focus position. If, however, the stop condition is not satisfied, the sample state matrix is updated with the kth focus value samples. The samples in the state matrix are normalized for comparison of the focus values. If a switch condition is not satisfied, the process proceeds to the next iteration (k=k+1) and repeats the updating, normalization and switch condition check as previously described. If the switch condition is satisfied, local estimates of the second partial derivatives of the focus value surface are computed and the switch condition is computed. The switch matrix to be used in the next iteration is computed and the analysis filters to be used at the next iteration are computed. The sample state matrix is updated if the switch condition is satisfied. The step size is updated and the focus actuator position is updated. Thereafter, the process loops back to determine whether the stop condition is satisfied and repeats as previously described until the final in-focus position is estimated. When the final in-focus position is estimated, the focusing lens is controlled to move to the final in-focus position. This method can be implemented by a computer readable medium encoded with a computer program wherein the steps are performed by one or more code segments.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which:

FIG. 3A is a graph depicting through focus MTF from geometric optics showing effective width change as a function of spatial frequency and defocus in accordance with one embodiment of the present invention;

FIG. 3B is a graph depicting sampling the effective width to derive an appropriate step-size for a given spatial frequency analysis band in accordance with one embodiment of the present invention;

FIG. 4 is a block diagram of a Filter-Switching automatic focusing system model in accordance with one embodiment of the present invention;

FIG. 5 is a flow chart depicting a method 500 for generating M sets of spatial frequency parameters and M focus actuator step sizes using the set of device parameters in accordance with one embodiment of the present invention;

FIG. 7A is a graph depicting the segmentation of spatial frequency axis into a set of band-edges using the relationship between effective width and spatial frequency during derivation of an M-band AF filterbank and corresponding step-sizes for a given camera in accordance with another embodiment of the present invention;

FIG. 7B is a graph depicting the M-band filterbank frequency response during derivation of an M-band AF filterbank and corresponding step-sizes for a given camera in accordance with another embodiment of the present invention;

FIG. 7C is a graph depicting the spatial impulse response during derivation of an M-band AF filterbank and corresponding step-sizes for a given camera in accordance with another embodiment of the present invention;

FIG. 7D is a graph depicting the discrete step-sizes associated with the center frequencies of the filterbank in FIG. 7B during derivation of an M-band AF filterbank and corresponding step-sizes for a given camera in accordance with another embodiment of the present invention;

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to digital cameras, but it will be understood that the concepts of the present invention are applicable to any digital image processing having automatic focusing.

The present invention provides an automatic focusing apparatus and method for digital images that automatically derives the passive AF parameters based on camera specifications, and uses the derived AF parameters in a Filter-Switching Search (FS) that reduces the number of iterations and lowers the auto focusing time while not compromising sharpness quality. The passive AF parameters are automatically derived based on the camera specifications including the lens F-number, the sensor's pixel pitch, and the focus actuator's step resolution. The derived parameters also include an optimum bank of digital band-pass filters matched to the camera specifications along with their corresponding step-size magnitudes.

The Filter-Switching Search (FS) takes advantage of the derived parameters to realize a self-tuning passive AF system where filters are switched and step-sizes are reduced as the search gets closer to the in-focus position by using local estimates of the first and second derivatives of the focus value surface. Such a formulation provides a means to automatically achieve a balance between AF speed and AF accuracy without extensive tuning or adjustment of difficult-to-set thresholds or parameters. In order to gauge the performance of passive AF systems, an experimental methodology is presented to standardize the performance testing of passive AF algorithms in terms of different light and contrast levels. By applying the developed framework on three different camera systems, it is demonstrated that the Filter-Switching Search (FS) outperforms the existing methods while requiring no or little parameter tuning/adjustment. The present invention can be used for AF systems in any digital imaging device, such as digital cameras (still or video), cell-phone cameras, computer cameras, personal data assistants (PDA), mobile communication devices, hand-held devices, vehicles, etc.

Figure 1:
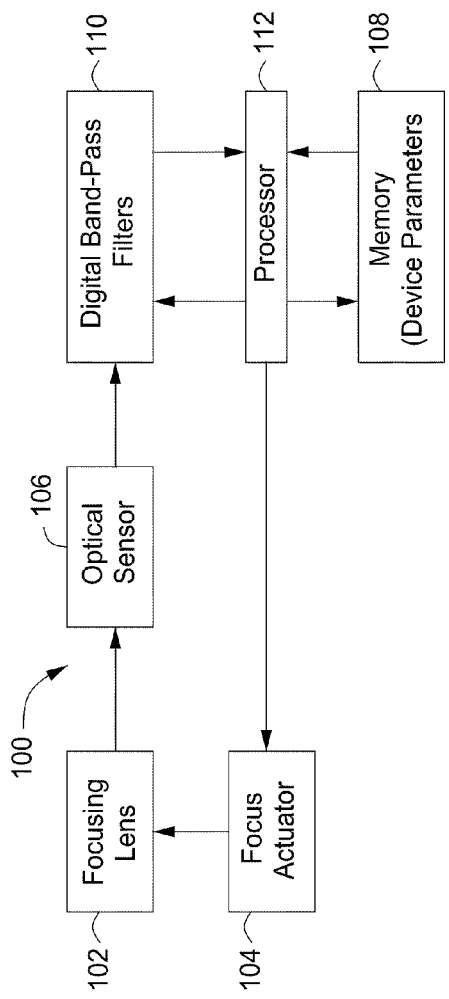
FIG. 1 is a block diagram depicting an automatic-focus apparatus in accordance with one embodiment of the present invention.

Now referring to FIG. 1, a block diagram depicting an automatic-focus apparatus 100 in accordance with one embodiment of the present invention is shown. The automatic focusing apparatus 100 includes a focusing lens 102, a focus actuator or lens driving circuit 104 connected to the focusing lens 102 to move the focusing lens 102, an image sensor, such as a CCD or CMOS, etc. 106 aligned with the focusing lens 102 to detect an image through the focusing lens 102, and a memory 108 storing a set of device parameters. The set of device parameters may include a F-number of the focusing lens ($F_\#$), a pixel sampling period of the image sensor ($T_{1,2}$), and a focus actuator sampling period ($T_3$). The image sensor 106 provides a noise-free, blurred, Bayer-pattern sampled image within a focus window from the detected image to the j digital band-pass filters 110 connected to the image sensor 106 to extract a set of sharpness samples from the noise-free, blurred, Bayer-pattern sampled image wherein j>=2. Furthermore, the apparatus 100 includes a processor, controller or central processing unit (CPU) 112 connected to the focus actuator 104, the digital band-pass filters 110 and the memory 108. The automatic focusing apparatus 100 can be integrated into a digital camera (still or video), a cell-phone camera, a computer, a personal data assistant, a mobile communication device, a hand-held device, or a vehicle.

As will be described in more detail below, the processor 112 (a) generates M sets of spatial frequency parameters and M focus actuator step sizes using the set of device parameters wherein M is a number of segments of a spatial frequency axis, and with i=1 (b) loads the i to i+j sets of spatial frequency parameters into the digital band-pass filters 110 (c) obtains a matrix of focus value samples from the digital band-pass filters 110, (d) controls the focus actuator 104 to sample a local surface behavior using the i focus actuator step size, (e) repeats steps (b) to (d) with i=i+1 whenever a switch condition is satisfied, and (f) estimates a final in-focus position for the image and controls the focusing lens to move to the final in-focus position whenever a stop condition is satisfied. Moreover, the processor 112 generates the M sets of spatial frequency parameters and the M focus actuator step sizes by (a) producing a set of spatial frequencies along the spatial frequency axis using the set of device parameters, (b) determines an effective width in focus actuator steps for each spatial frequency using the set of device parameters, (c) segments the spatial frequency axis into a set of candidate band edges using the effective width for each spatial frequency, (d) constructs the M sets of spatial frequency parameters from the set of candidate band edges, and (e) computes the M focus actuator step sizes using the spatial frequency parameters and the set of device parameters.

Figure 2:
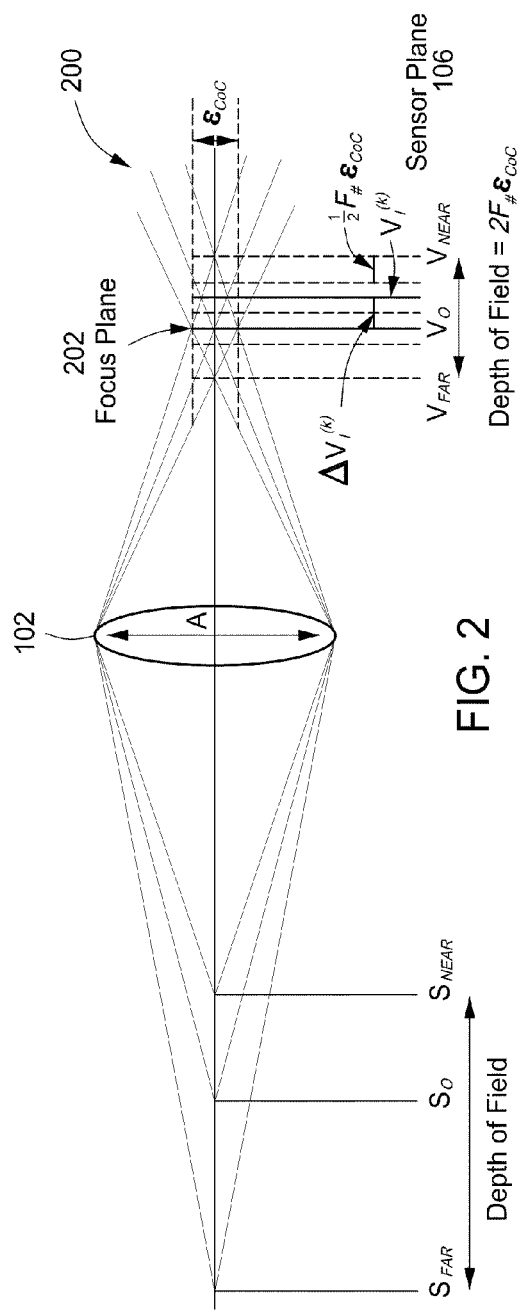
FIG. 2 is diagram depicting a geometric optics image formation model in accordance with one embodiment of the present invention.

Referring now to FIG. 2, a diagram depicting a geometric optics image formation model 200 in accordance with one embodiment of the present invention is shown in order to derive the center frequencies and corresponding step sizes from the camera parameters. Focusing lens 102 has a lens of aperture diameter A and focal length $f_F$. A point object at a distance so in front of the focusing lens 102 is brought into focus at a distance $v_O$ behind the focusing lens 102. If the sensor plane (optical sensor 106) is defocused at a distance $\Delta v_I^{(k)} = v_I^{(k)} - v_O$ away from the in-focus plane 202 at $v_O$, where $v_I^{(k)} = n_3^{(k)} T_3$ is the imager distance at the kth iteration, then the image of the object point will spread out to form a blur circle of radius $r^{(k)}$ on the image sensor 106, which from similar triangles and the lens equation, can be shown to be $$r^{(k)} = \frac{\Delta v_I^{(k)} (s_O - f_F)}{2 s_O F_\#}. \tag{1}$$

This blur circle results in the well-known circular Point Spread Function (PSF), $$h_{PSF}(n^{(k)}) = \begin{cases} \frac{\delta(n_3^{(k)})}{\pi (r^{(k)})^2} & n_1^2 + n_2^2 \le (r^{(k)})^2 \\ 0 & \text{other.} \end{cases} \tag{2}$$

The Fourier transform of the PSF is the Optical Transfer Function (OTF), and is given by [17]

$$H_{PSF}(f_{sp};k) = 2 jinc(2\pi r^{(k)} \|f_{sp}\|_2), \tag{3}$$

where $f_{sp} = [f_1 f_2]^T$ is a vector of spatial frequencies in cycles per mm and $$jinc(x) = \frac{J_1(x)}{x},$$

where $J_1(x)$ is the Bessel function of the first kind of order one. By substituting equation (1) in equation (3), one can derive the so-called through-focus OTF for the lens as follows [17]:

$$H_{PSF}(f_{sp};k) = 2 jinc\left(\pi \frac{(s_O - f_F) \Delta v_I^{(k)}}{s_O F_\#} \|f_{sp}\|_2\right). \tag{4}$$

By fixing $s_O$, $f_F$, and $F_\#$, the through focus Modulation Transfer Function (MTF), $|H_{PSF}|$, can be plotted to observe its behavior as a function of defocus amount $\Delta v_I^{(k)}$ and spatial frequency $\|f_{sp}\|_2$ as shown in FIG. 3A. From this figure, it can be seen that as the spatial frequency increases, the width of $|H_{PSF}|$ varies from being large at low spatial frequencies to small at high spatial frequencies. Without considering the object image spectrum, FIG. 3A essentially provides a view of the focus value surface.

For a given spatial frequency, the effective width of the $|H_{PSF}|$ curve, denoted by $w(f_{sp})$ corresponds to the width of the main lobe, that is the distance between the two zero crossings on either side of the main peak as shown in FIG. 3B.

It can be easily shown that the effective width in mm is given by $$w(f_{sp}) = 2.44 F_\# f_{sp}^{-1}, \tag{5}$$

where $f_{sp}$ denotes spatial frequency in cycles per mm.

Now referring to FIG. 4, a block diagram of a Filter-Switching automatic focusing system model 400 in accordance with one embodiment of the present invention is shown. The noise-free, blurred image $f(n^{(k*)})$ from the image sensor 106 is subjected to the well-know circular PSF 402 described above with reference to equation (2). $h_{PSF}(n^{(k)})$ is the camera lens' PSF 402, which imparts a certain amount of blur to a hypothetical blur free Bayer-pattern image $f(n^{(k*)})$, resulting in image $y(n^{(k)})$. To model the noise present in the digital imaging system, the zero-mean white Gaussian noise (AWGN) term $z(n^{(k)})$, which is considered to be independent of the signal and lens position, and has a standard deviation of $\sigma_z$, is added 404 to produce a noisy, blurred image $y_z(n^{(k)})$ which models the actual Bayer-pattern image coming from the image sensor and used for AF statistics generation. Note that it is possible to insert a digital filtering stage prior to band-pass filter 110 to reduce the noise. The index vector is defined as $n^{(k)} = [n_1 \; n_2 \; n_3^{(k)}]^T$ where the indices $n_1$ and $n_2$ represent discrete spatial positions (row and column, respectively) in the 2D image plane, and the index $n_3$ represents the kth imaging distance used in the AF search algorithm, or an element from the set of all discrete lens imaging positions. The noisy observation $y_z(n^{(k)})$ is then subjected to spatial frequency decomposition via a set of digital band-pass filters $h_d(n^{(k)}; f_j^{(k)})$ 110 for the purpose of extracting the sharpness samples $S_{color}^d(x_j^{(k)})$ for the AF search algorithm, where index d∈{H, V} indicates the directionality (horizontal or vertical) of the filtering operation, $f_j^{(k)}$ the jth filter slot's center frequency at the kth iteration, color the Bayer-pattern color plane being processed, and the vector $x_j^{(k)} = [n_3^{(k)} \; f_j^{(k)}]^T$ indexes the kth iteration of the focus actuator position and center frequency.

A measure of image brightness $B_{color}(n_3^{(k)})$ is also extracted for normalizing the sharpness measure to changes in image brightness. The focus value or sharpness measure considered here is the average of the output energies of the horizontal and vertical band-pass filters normalized by the square of the brightness value. Note that other sharpness measures can be used within the framework introduced here.

Due to the use of a Bayer-pattern image, the quincunx sampled green plane from $y_z(n^{(k)})$ is structurally separated into rectangular $G_R$ and $G_B$ color planes and processed as shown in FIG. 4. The final focus value is then formulated as the sum of the two focus values from the $G_R$ and $G_B$ planes as follows:

$$F_{BPF}(x_j^{(k)}) = \frac{S_{G_R}^H(x_j^{(k)}) + S_{G_R}^H(x_j^{(k)})}{2 B_{G_R}^2(n_3^{(k)})} + \frac{S_{G_B}^V(x_j^{(k)}) + S_{G_B}^V(x_j^{(k)})}{2 B_{G_B}^2(n_3^{(k)})}. \tag{6}$$

$F_{BPF}(x_j^{(k)})$ can be viewed as a surface on the 2D focus actuator-spatial frequency plane, and is thus referred to here as the focus value surface. The FS AF Search Algorithm 406 takes in a set of FS AF Search Parameters 408 that includes M band-pass center spatial frequencies, $f_{c,i}$, and discrete step-size magnitudes, $\Delta n_{3,i}$, derived from the camera or device parameters 410 stored in memory 108. The device parameters 410 may include $F_\#$, the F-number of the lens, $T_{1,2}$, the pixel sampling period of the image sensor in millimeters (mm) per pixel, and $T_3$, the focus actuator sampling period in mm per focus actuator step. Based on the above, the processor 112 can automatically determine the search parameters via the effective width relationship of equation (5).

Referring now to FIG. 5, a flow chart depicting a method 500 for generating M sets of spatial frequency parameters and M focus actuator step sizes using the set of device parameters 410 in accordance with one embodiment of the present invention is shown. A set of spatial frequencies along the spatial frequency axis are produced using the set of device parameters 410 in block 502. An effective width in focus actuator steps for each spatial frequency is determined using the set of device parameters 410 in block 504. Thereafter, the spatial frequency axis is segmented into a set of candidate band edges using the effective width for each spatial frequency in block 506. The M sets of spatial frequency parameters are then constructed from the set of candidate band edges in block 508 and the M focus actuator step sizes are computed using the spatial frequency parameters and the set of device parameters 410 in block 510. This method can be implemented by a computer readable medium encoded with a computer program wherein the steps are performed by one or more code segments.

Figure 6:
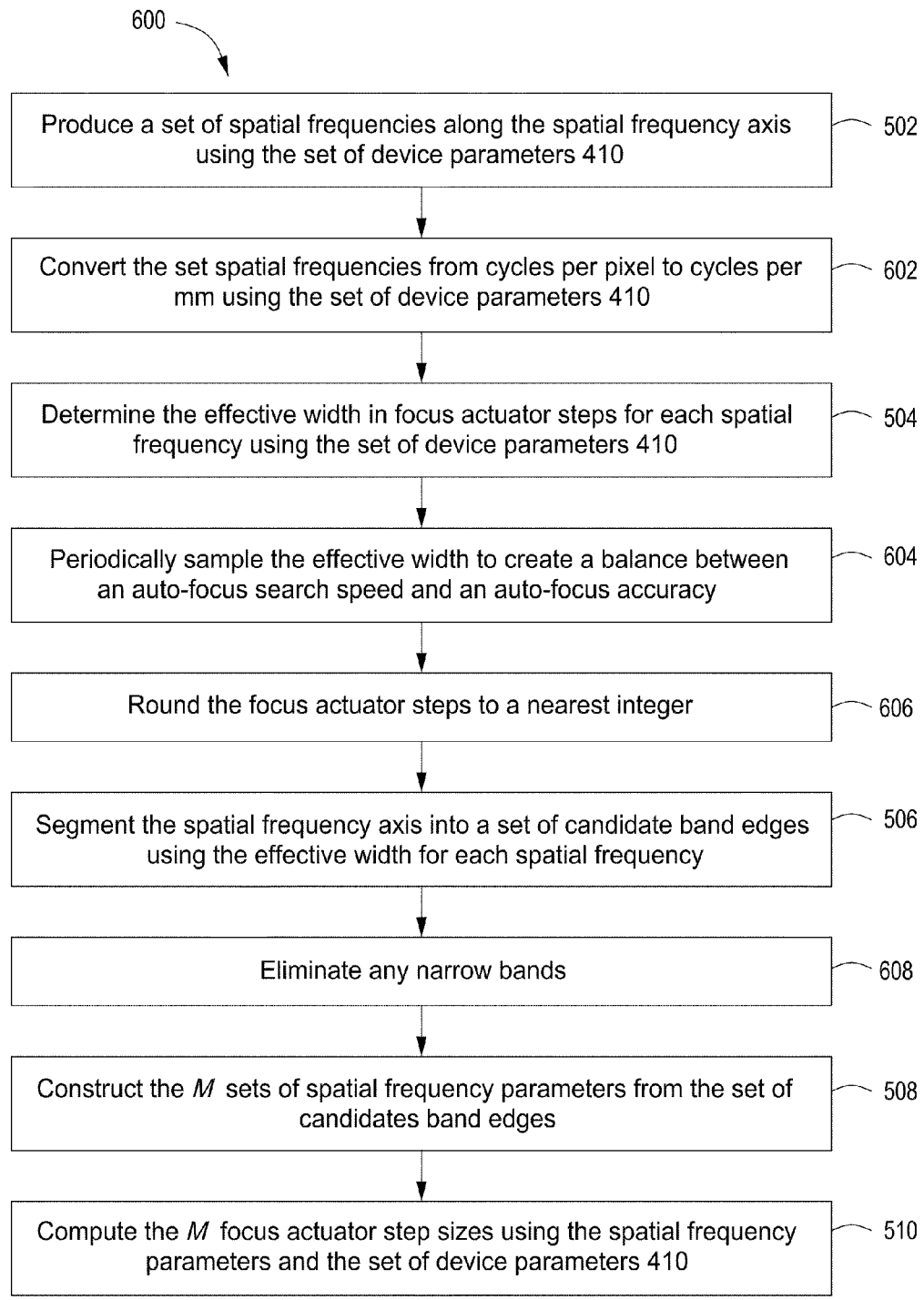
FIG. 6 is a flow chart depicting a method 600 for generating M sets of spatial frequency parameters and M focus actuator step sizes using the set of device parameters 410 in accordance with another embodiment of the present invention.

Now referring now to FIG. 6, a flow chart depicting a method 600 for generating M sets of spatial frequency parameters and M focus actuator step sizes using the set of device parameters 410 in accordance with another embodiment of the present invention is shown. A set of spatial frequencies along the spatial frequency axis are produced using the set of device parameters 410 in block 502. The set of spatial frequencies are converted from cycles per pixel to cycles per mm using the set of device parameters 410 in block 602. An effective width in focus actuator steps for each spatial frequency is determined using the set of device parameters 410 in block 504. The effective width is then periodically sampled to create a balance between an auto-focus search speed and an auto-focus accuracy in block 604 and the focus actuator steps are rounded to a nearest integer in block 606. Thereafter, the spatial frequency axis is segmented into a set of candidate band edges using the effective width for each spatial frequency in block 506 and the candidate band edges are merged to eliminate any narrow bands in block 608. The M sets of spatial frequency parameters are then constructed from the set of candidate band edges in block 508 and the M focus actuator step sizes are computed using the spatial frequency parameters and the set of device parameters 410 in block 510. This method can be implemented by a computer readable medium encoded with a computer program wherein the steps are performed by one or more code segments.

The mathematical formulas underlying the method 600 will now be described in detail:

Step 1 (502): Periodically sample the digital spatial frequency axis in the interval $T_4 \leq f_{sp}' \leq \frac{1}{2}$ with a spacing of $T_4$ cycles per pixel between successive samples to produce a set of spatial frequencies $$f_{sp}' = n_4 T_4, \quad (7)$$

for $n_4$ varying from 1 to $N_4-1$, where $N_4=(2T_4)^{-1}+1$. Uniform, rectangular sampling of the focus actuator-spatial frequency plane can be achieved by selecting $T_4=T_3$.

Step 2 (602): Convert the set of spatial frequencies $f_{sp}'$ in cycles per pixel to those in cycles per mm via the pixel sampling period, $T_{1,2}$, according to $$f_{sp} = \frac{f_{sp}'}{T_{1,2}}. \quad (8)$$

Step 3 (504): The effective width in focus actuator steps for a given spatial frequency $f_{sp}'$ can be derived by substituting equation (8) into equation (6) and dividing by the focus actuator sampling period $T_3$, that is $$w(n_4) = \frac{2.44 F_\# T_{1,2}}{n_4 T_3 T_4}. \quad (9)$$

Step 4 (604): For a fixed $n_4$, periodically sample the effective width with a spacing of $$\Delta w(n_4) = \frac{w(n_4)}{T_5} \quad (10)$$

steps in between successive samples, where $T_5$ is an adjustable parameter to create a balance between the AF search speed and accuracy. The spacing in equation (10) is essentially a step-size associated with a focus value curve extracted from the spatial frequency of equation (7).

Step 5 (606): Since focus actuator steps are positive integers, quantize equation (9) to produce $$\Delta w_q(n_4) = Q[\Delta w(n_4)], \quad (11)$$

where $Q[.]$ is the round-to-nearest integer operator. If for any $n_4$, equation (11) is 0, its value is replaced with the next minimum value of equation (11) which is greater than 0.

Step 6 (506): Use the digital curve of equation (11) to segment the spatial frequency axis into a set of $E_4$ candidate band edges, $f_{edge}(e_4)$, with $e_4$ indicating band edge index, using the following first-difference operator $\partial_{n_4}[.]$ along the $n_4$ direction $$\partial_{n_4}[\Delta w_q(n_4)] = \Delta w_q(n_4+1) - \Delta w_q(n_4), \quad (12)$$

for $n_4$ varying from 1 to $N_4-2$. The band edge frequencies are then selected as follows using equation (12):

$$(i) f_{edge}(0) = f_{min}, \quad (13)$$

where $f_{min}$ is the minimum spatial frequency considered.

$$(ii) f_{edge}(1) = (n_4-1)T_4, \quad (14)$$

where $n_4$ is the first sample location where $\partial_{n_4}[\Delta w_q(n_4)] = 0$.

$$(iii) f_{edge}(e_4) = (n_4+1)T_4, \quad (15)$$

for $e_4$ ranging from 2 to $E_4-2$, where $n_4$ are sample locations where $\partial_{n_4}[\Delta w_q(n_4)] = -1$ with the restriction that $n_4 T_4 > f_{edge}(1)$.

$$(iv) f_{edge}(E_4-1) = \frac{1}{2} - f_{min} \quad (16)$$

Step 7 (608): To avoid over-segmentation of the spatial frequency axis, merge the candidate band edges to eliminate narrow bands as follows:

If $f_{edge}(E_4-1) - f_{edge}(e_4) > 2T_4$, then the $e_4$th edge is kept, otherwise it is removed. The last edge is always kept in the list, but to prevent over-segmentation of the highest frequency band, this check is done $f_{edge}(E_4-1) - f_{edge}(E_4-2) < 4.5 T_4$, and if true, the edge $E_4-2$ is also removed.

After this process is completed, $E_4$ is set to the total number of remaining edges.

Step 8 (508): From the set of $E_4$ band edges, construct a set of $M=E_4-1$ filters or a filterbank with the following lower and upper band edges and center frequencies $$f_{l,i} = f_{edge}(i) \tag{17}$$

$$f_{u,i} = f_{edge}(i+1) \tag{18}$$

and $$f_{c,i} = \tfrac{1}{2}(f_{u,i} - f_{l,i}), \tag{19}$$

for i ranging from 0 to M−1.

Step 9 (510): Finally, compute a set of step-sizes associated with the ith band by substituting the center frequencies of equation (19) converted into units of cycles per mm via division by $T_{1,2}$ in equation (6) as indicated below $$\Delta n_{3,i} = \frac{1}{T_3 T_5}\left(w\left(\frac{f_{c,i}}{T_{1,2}}\right) - w\left(\frac{f_{c,M-1}}{T_{1,2}}\right)\right) + \Delta n_{3,M-1}, \tag{20}$$

for i ranging from 0 to M−2, and the minimum step-size of $$\Delta n_{3,M-1} = \left\lceil \frac{(F_\# \varepsilon_{CoC})}{2T_3} \right\rceil, \tag{21}$$

which is defined with the consideration of the maximum tolerable blur circle diameter $\varepsilon_{CoC}$ and $\lceil . \rceil$ denoting the ceiling operator. In general, if the blur circle spreads over two pixels, the image information is lost. For a Bayer pattern sensor, this translates into the blur circle spreading over two 2×2 sets of Bayer pixels. Thus, $\varepsilon_{CoC}$ is set to four times the diagonal of a square pixel, that is $\varepsilon_{CoC} = 4T_{1,2}\sqrt{2}$.

The above segmentation procedure answers the questions of how many digital band-pass filters are necessary for a passive AF system and what step-sizes should be used for a focus value curve extracted from a given band-pass filter. In order to realize the derived M-band filterbank, for example fourth-order IIR Butterworth digital band-pass filters can be designed based on the set of lower and upper band-edge spatial frequencies. Such filters can be implemented efficiently using a cascade of second-order, direct-form II filter sections [18]. It is known that the general form of the spatial impulse response of the 1D horizontal (similarly for vertical direction) fourth-order IIR Butterworth digital band-pass filter can be written as the sum of two digital cosine waveforms as follows [18]:

$$h_H(n^{(k)}; f_j^{(k)}) = \tag{22}$$
$$\alpha \delta(n_1)\delta(n_2)\delta(n_3^{(k)}) + \beta^{n_1}\cos(\tau_1 n_1 + \theta_1) u(n_1)\delta(n_2)\delta(n_3^{(k)}) +$$
$$\gamma^{n_1}\cos(\tau_2 n_1 + \theta_2) u(n_1)\delta(n_2)\delta(n_3^{(k)})$$

where parameters $\alpha, \beta, \gamma, \tau_1, \tau_2, \theta_1,$ and $\theta_2$ are defined in terms of the filter's two pairs of complex conjugate poles, which are in-turn functions of the band-edge frequencies of equation (17) and equation (18).

Referring now to FIGS. 7A-7D, various graphs illustrating the derivation of an M-band AF filterbank and corresponding step-sizes for a given device or camera in accordance with another embodiment of the present invention are shown.

FIGS. 7B and 7D show the realization of such a passive AF M-band filterbank and step-sizes corresponding to the spatial frequency decomposition of FIG. 7A. As can be seen by the spatial impulse response of FIG. 7C, the lower frequency filters correlate with slowly varying spatial detail while the higher frequency filters correlate with rapidly varying spatial detail. The adaptive step-size sharpness algorithm based on the above formulation will now be described.

Figure 8:
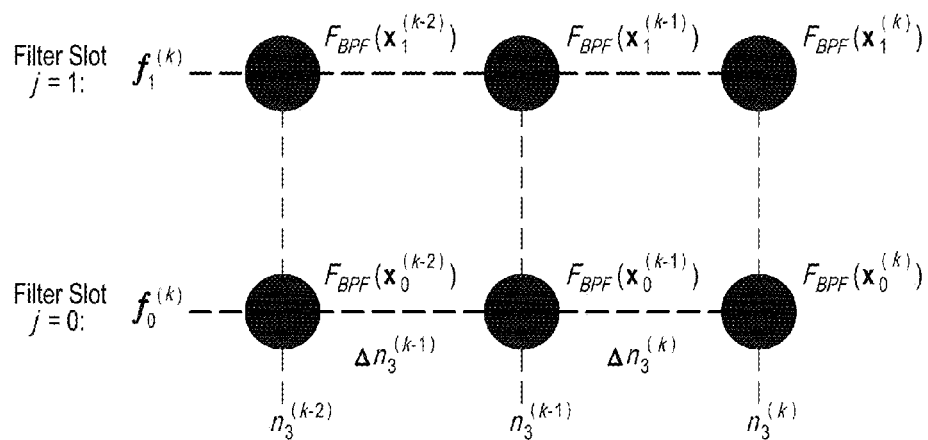
FIG. 8 depicts six-sample stencil used to estimate local behavior of the focus value surface during the search in accordance with another embodiment of the present invention.

Given the M-band filterbank defined in terms of the center spatial frequencies in equation (19) and the step-sizes in equation (20) and equation (21), a sharpness search algorithm is formulated to switch amongst the set of filters, two at a time, and decrease the step size automatically as the search gets closer to the peak location by utilizing local estimates of the first and second derivatives of the focus value surface $F_{BPF}(x_j^{(k)})$, without the use of thresholds or difficult-to-set parameters. Although there are M bands, it should be pointed out that the focus values of all M bands need not be computed simultaneously. The search is formulated to utilize only two bands out of M at any given moment loaded into filter computation slots 0 and 1, thus reducing the amount of computational complexity and keeping the search compatible with existing passive AF hardware solutions, which usually incorporate two filters whose outputs can be computed simultaneously from the incoming stream of Bayer pattern image data. Note that more than two bands can be computed simultaneously if the device has more than two digital band-pass filters. As illustrated in FIG. 8, the search operates based on keeping track of the local surface behavior via a stencil of six samples from the two filter slots.

Figure 9:
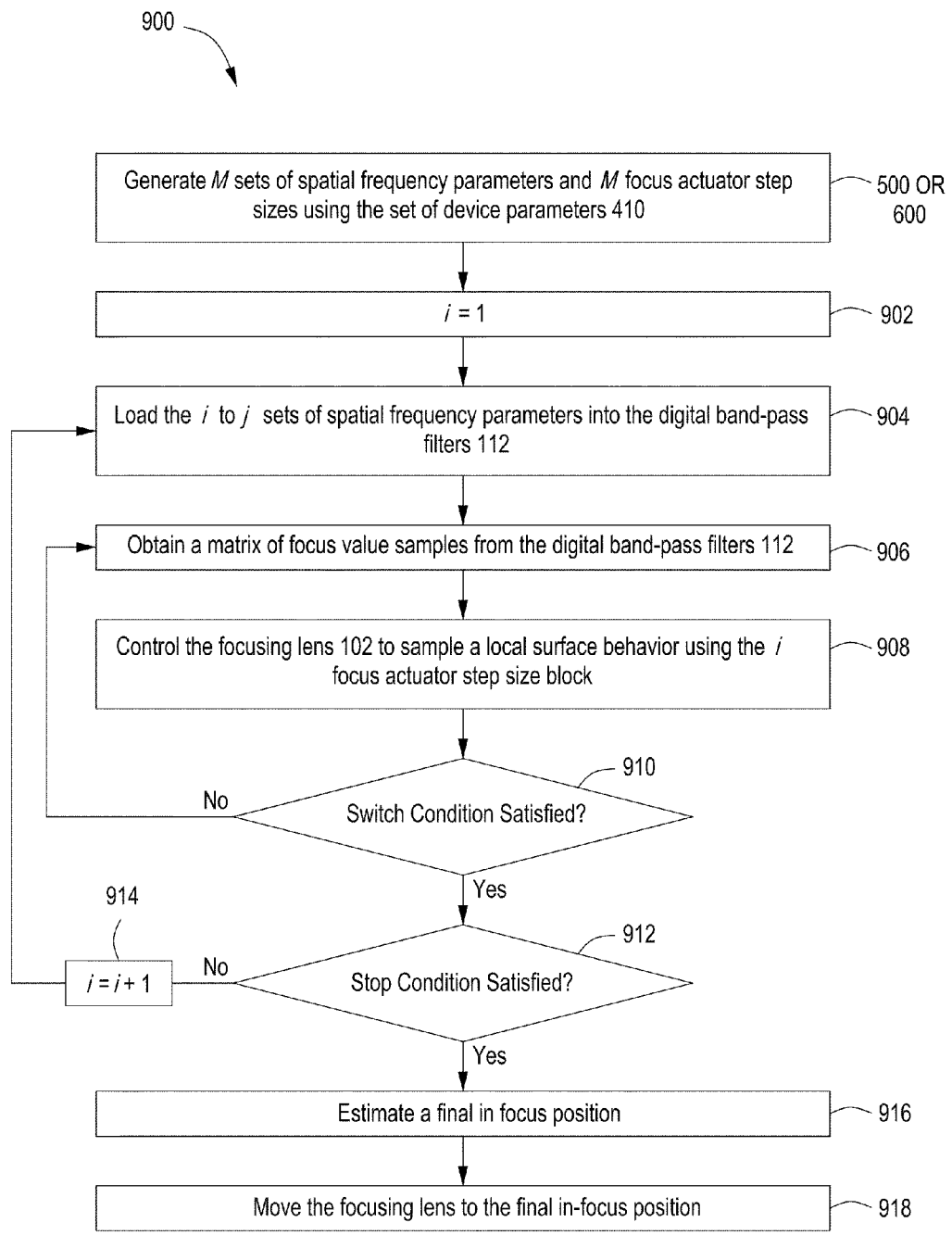
FIG. 9 is a flow chart depicting a method for automatically focusing a focusing lens using j digital band-pass filters in accordance with one embodiment of the present invention.

Now referring to FIG. 9, a flow chart depicting a method 900 for automatically focusing a focusing lens 102 using j digital band-pass filters 110 wherein j>=2 in accordance with one embodiment of the present invention is shown. M sets of spatial frequency parameters and M focus actuator step sizes using a set of device parameters 410 are generated in block 500 (see FIG. 5) or block 600 (see FIG. 6). M is a number of segments of a spatial frequency axis. With i=1 in block 902, the i to j sets of spatial frequency parameters are loaded into the digital band-pass filters in block 904. Note that the number of sets of spatial frequency parameters loaded will depend on the number of digital filters being used (e.g., two, three, all, etc.). Next, a matrix of focus value samples is obtained from the digital band-pass filters in block 906, and the focusing lens is controlled to sample a local surface behavior using the i focus actuator step size in block 908 until a switch condition is satisfied, as determined in decision block 910. If a switch condition is satisfied, as determined in decision block 910, and the stop condition is not satisfied, as determined in decision block 912, the process loops back and repeats the loading, obtaining and controlling steps of block 904-908 with i=i+1 (block 914). If the stop condition is satisfied, as determined in decision block 912, a final in-focus position is estimated for the image in block 916 and the focusing lens is controlled to move to the final in-focus position in block 918. The switch condition is typically an indication of a slope sign change, whereas the stop condition is typically either an end of a search range has been reached or the search moved to a position beyond the end of the search range. This method can be implemented by a computer readable medium encoded with a computer program wherein the steps are performed by one or more code segments.

Figure 10:
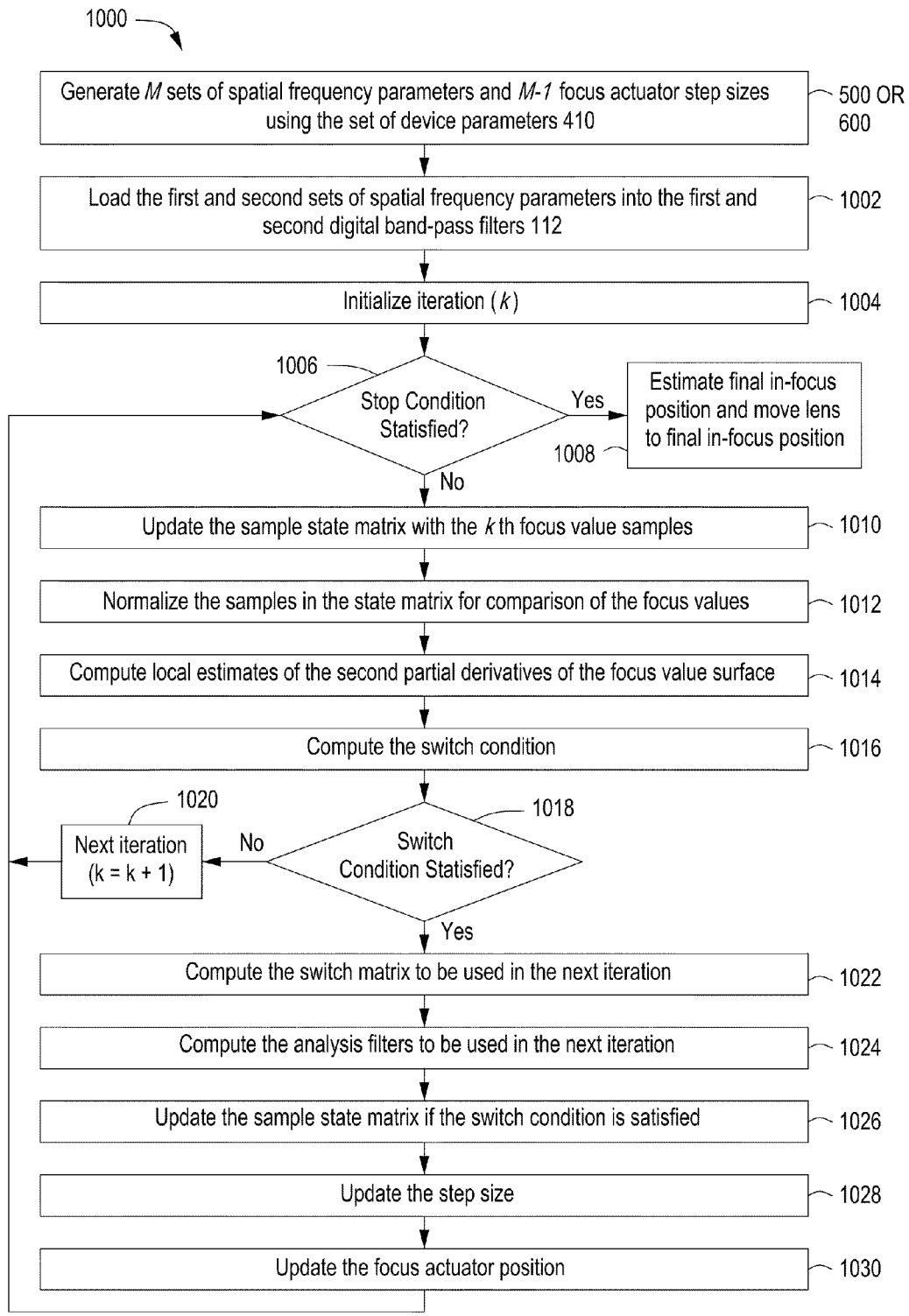
FIG. 10 is a flow chart depicting a method for automatically focusing a focusing lens using j digital band-pass filters in accordance with another embodiment of the present invention.

Referring now to FIG. 10, a flow chart depicting a method 1000 for automatically focusing a focusing lens using j digital band-pass filters in accordance with another embodiment of the present invention is shown. M sets of spatial frequency parameters and M focus actuator step sizes are generated using the set of device parameters 410 in block 500 (FIG. 5) or 600 (FIG. 6) wherein M is a number of segments of a spatial frequency axis. The first and second sets of spatial frequency parameters are loaded into the first and second digital band-pass filters 110, respectively, in block 1002. The iteration k is initialized in block 1004. If the stop condition is satisfied, as determined in decision block 1004, the final in-focus position is estimated and the focusing lens is moved to the final in-focus position in block 1008. If, however, the stop condition is not satisfied, the sample state matrix is updated with the kth focus value samples in block 1010. The samples in the state matrix are normalized for comparison of the focus values in block 1012. Local estimates of the second partial derivatives of the focus value surface are computed in block 1014 and the switch condition is computed in block 1016.

If a switch condition is not satisfied, as determined in decision block 1018, the process proceeds to the next iteration (k=k+1) in block 1020 and repeats blocks 1006-1018 as previously described. If the switch condition is satisfied, as determined in decision block 1018, the switch matrix to be used in the next iteration is computed in block 1022 and the analysis filters to be used at the next iteration are computed in block 1024. The sample state matrix is updated in block 1026 if the switch condition is satisfied. The step size is updated in block 1028 and the focus actuator position is updated in block 1030. Thereafter, the process loops back to decision block 1006 to determine whether the stop condition is satisfied. This method can be implemented by a computer readable medium encoded with a computer program wherein the steps are performed by one or more code segments.

The mathematical formulas underlying the method 1000 will now be described in detail. Considering the kth iteration, the logic behind the Filter-Switching Search algorithm can be compactly formulated using matrix-vector notation as follows:

Step 1 (1006): Check Stop Condition II (stopping conditions are described later in the section).

Step 2 (1010): Update the sample state matrix $\Phi^{(k)}$ with the kth focus value samples as $$\Phi^{(k)} = \Phi^{(k-1)} L_3 + [0 \, [F_{BPF}(x_1^{(k)}) \, F_{BPF}(x_0^{(k)})]^T] \quad (23)$$

where $\Phi^{(k)}$ is a 2×3 matrix of samples from the focus value surface, $L_3$ is a 3×3 left-shift matrix with ones on the lower diagonal, 0 is a 2×2 matrix of zeros, $F_{BPF}(x_0^{(k)})$ and $F_{BPF}(x_1^{(k)})$ are the latest focus values computed at step-position $n_3^{(k)}$ using the filter associated with the center spatial frequencies $f_0^{(k)}$ and $f_1^{(k)}$. The constructed state matrix $\Phi^{(k)}$ is a sliding window which keeps track of the latest six samples of the focus value surface for differential analysis.

Step 3 (1012): Normalize the samples in the state matrix $\Phi^{(k)}$ for comparison of the two focus values via $$\Phi'^{(k)} = \text{diag}((F_{BPF}(x_1^{(k)}))^{-1}, (F_{BPF}(x_0^{(k)}))^{-1}) \Phi^{(k)}, \quad (24)$$

where diag(.) indicates a 2×2 diagonal matrix operator.

Step 4 (1014): Check Stop Condition I.

Step 5 (1018): Compute local estimates of the second partial derivatives of the focus value surface expressed as $$\frac{\partial^2 F_{BPF}(x_j^{(k)})}{\partial n_3^2} = s_j^T \Phi'^{(k)} \hat{d}_{II}^{(k)} \quad (25)$$

and, $$\frac{\partial^2 F_{BPF}(x_j^{(k)})}{\partial f \partial n_3} = \text{trace}(\Phi'^{(k)} (\hat{D}_{II}^{(k)})^T), \quad (26)$$

where $$\hat{d}_{II}^{(k)} = \begin{bmatrix} (\Delta n_3^{(k-1)}(\Delta n_3^{(k)} + \Delta n_3^{(k-1)}))^{-1} \\ -(\Delta n_3^{(k)} \Delta n_3^{(k-1)})^{-1} \\ (\Delta n_3^{(k)}(\Delta n_3^{(k)} + \Delta n_3^{(k-1)}))^{-1} \end{bmatrix} \quad (27)$$

and $$\hat{D}_{II}^{(k)} = (2\Delta n_3^{(k-1)})^{-1} \times \begin{bmatrix} -1 & (1 - \Delta n_3^{(k-1)} (\Delta n_3^{(k)})^{-1}) & 0 \\ 1 & -(1 - \Delta n_3^{(k-1)} (\Delta n_3^{(k)})^{-1}) & 0 \end{bmatrix} \quad (28)$$

are the estimates of the second partial derivatives, and $s_j^T$ is a selection vector defined in Step 10, which is used to switch amongst the values from filter slot 0 and 1.

Step 6 (1020): Compute the switch condition given by $$k_{match} = \begin{cases} k & \left(\frac{\partial^2 F_{BPF}(x_j^{(k)})}{\partial n_3^2} < 0\right) \vee \left(\frac{\partial^2 F_{BPF}(x_j^{(k)})}{\partial f \partial n_3^2} > 0\right) \\ k_{switch} & \text{other,} \end{cases} \quad (29)$$

where switch $k_{switch}$ denotes the iteration at which the switch condition is satisfied. The switch condition is the heart of the FS search and consists of two criteria based on analyzing the local estimates of the second differential behavior of the focus value surface.

The first condition, $$\left(\frac{\partial^2 F_{BPF}(x_j^{(k)})}{\partial n_3^2} < 0\right),$$

is a check for negative curvature along the focus actuator movement direction. If the curvature is negative, it means that the search has moved to a position past the inflection point (or the curve of zero Gaussian curvature) on the current slice of the surface and is nearing the peak for the focus value curve based on the spatial frequency band under analysis. In order to slow down the search, the spatial frequency band is increased and the step-size decreased to allow the search to reduce the amount of overshooting of the peak as it nears the in-focus position.

The second condition, $$\left(\frac{\partial^2 F_{BPF}(x_j^{(k)})}{\partial f \partial n_3} > 0\right),$$

is analogous to comparing estimates of the slopes of the two focus value curves under analysis. If the estimated slope of the focus value curve from the higher spatial frequency filter $f_1^{(k)}$ is steeper than that of the focus value curve of the lower spatial frequency filter $f_0^{(k)}$, it means that the search is getting closer to the peak. The search is slowed down by switching to a focus value curve for a higher spatial frequency band and its corresponding smaller step-size.

Step 7 (1022): Compute the switch matrix $S^{(k+1)}$ for the next iteration as indicated below $$S^{(k+1)} = \begin{cases} S^{(k)} U_M & (k = k_{switch}) \wedge (f_o^{(k)} \neq f_{c,M-2}) \\ S^{(k)} & \text{other,} \end{cases} \quad (30)$$

where $S^{(k+1)}$ is a 2×M matrix which is initialized to $$S^{(0)} = \begin{bmatrix} 0 & 1 & \ldots & 0 \\ 1 & 0 & \ldots & 0 \end{bmatrix}$$

at the beginning of the search and $U_M$ is an M×M upper-shift matrix with ones on the superdiagonal. If the filter loaded into slot 0, $f_o^{(k)}$ is equal to $f_{c,M-2}$, then there is no need to switch to another two sets of filters as the algorithm has converged to the last two filters in the filterbank.

Step 8 (1024): Compute the analysis filters to be used at the next iteration as $$f^{(k+1)} = S^{(k+1)} f_c \quad (31)$$

where $f_c = [f_{c,0} \ f_{c,0} \ \ldots \ f_{c,M-1}]^T$ is the vector of M spatial center frequencies, and $f^{(k)}$ denotes the vector whose elements are the center spatial frequencies for the two filters loaded into filter slots 0 and 1: $f^{(k)} = [f_1^{(k)} \ f_0^{(k)}]^T$.

Step 9 (1026): Update sample state matrix if the switch condition is satisfied as indicated below $$\Phi^{(k)} = \begin{cases} L_2 \Phi^{(k)} + \begin{bmatrix} 0 \begin{bmatrix} F_{BPF}(x_1^{(k+1)}) \\ 0 \end{bmatrix} \end{bmatrix} & (k = k_{switch}) \wedge (f_0^{(k)} \neq f_{c,M-2}) \\ \Phi^{(k)} & \text{other,} \end{cases} \quad (32)$$

where $L_2$ is a 2×2 down-shift operator with ones on the lower diagonal. This operation incorporates the loading of the new filter into slot 1 and computing its focus value sample at the current focus actuator position. The existing set of three samples from the previous slot 1 filter are moved down one row (removing the samples from the previous slot 0 filter), while the new sample for the new filter is added to the state matrix.

Step 10 (1028): Update the step-size as follows:

$$\Delta n_3^{(k+1)} = \begin{cases} s_j^T S^{(k+1)} \Delta n_3 & (k = k_{switch}) \\ \Delta n_3^{(k)} + 1 & (k \neq k_{switch}) \wedge (\Delta n_3^{(k)} \neq \Delta n_{3,M-1}) \\ \Delta n_3^{(k)} & \text{other,} \end{cases} \quad (33)$$

where $\Delta n_3$ denotes the vector of M step-sizes, $\Delta n_3 = [\Delta n_{3,0} \ \Delta n_{3,1} \ \ldots \ \Delta n_{3,M-1}]^T$ and the vector $s_j^T$ denotes the filter slot selection vector where $$j = \begin{cases} 0 & (k = k_{switch}) \wedge (f_0^{(k)} = f_{c,M-2}) \\ 1 & \text{other} \end{cases} \quad (34)$$

is the index of the active filter slot, and $s_0 = [1 \ 0]^T$, $s_1 = [0 \ 1]^T$. When the switch condition is satisfied, the step-size of the new filter is loaded for the next iteration. If the step-size has not converged to the smallest step-size, then the step-size is incremented by one step provided that the switch condition is not satisfied. Once the step-size has converged to the smallest size, it is not incremented any further. The selection vector $s_j^T$ is used to switch from filter slot 0 to filter slot 1 when the algorithm has converged to the last two filters in the filter-bank.

Step 11 (1030): Update the focus actuator position to $$n_3^{(k+1)} = n_3^{(k)} + \Delta n_3^{(k+1)} \quad (35)$$

Step 12 (1006): Check Stop Condition II.

The stopping condition for the FS search is another key aspect of the algorithm and consists of two stop condition checks described next.

Stop Condition I: If $\Phi'^{(k)}$ is fully populated, then compute an estimate of the following first partial derivative along the focus actuator direction for the filter slot determined by $s_j^T$, $$\left( \frac{\partial F_{BPF}(x_j^{(k)})}{\partial n_3} \right) = s_j^T \Phi'^{(k)} \hat{d}_I^{(k)}, \quad (36)$$

where $\hat{d}_I^{(k)}$ is an estimate of the first derivative formed by taking the average of two backward finite differences as given by equation (37):

$$\hat{d}_I^{(k)} = 2^{-1} \begin{bmatrix} -(\Delta n_3^{(k-1)})^{-1} \\ (\Delta n_3^{(k)} - \Delta n_3^{(k-1)})(\Delta n_3^{(k)} \Delta n_3^{(k-1)})^{-1} \\ (\Delta n_3^{(k)})^{-1} \end{bmatrix} \quad (37)$$

If there is an indication of a slope sign change as given by $$\left( \left( \frac{\partial \Delta F_{BPF}(x_j^{(k)})}{\partial n_3} \right) < 0 \right) \wedge \left( \left( \frac{\partial \Delta F_{BPF}(x_j^{(k-1)})}{\partial n_3} \right) > 0 \right),$$

then the following procedure is performed to determine whether to continue or end the search by validating the sign change. The iteration at which the maximum focus value occurred for the currently loaded filter is first obtained from the following optimization $$k'_{max} = \underset{l \in [k'_{switch}, k]}{\operatorname{argmax}} F_{BPF}(x_j^{(l)}), \quad (38)$$

where $k'_{switch}$ denotes the iteration in which filter $f_j^{(k)}$ was first loaded. The following conditions are then checked:

(i') If $k'_{max} = k'_{switch}$, provided that $f_j^{(k)} \geq f_{c,1}$, the history of focus values from the previously loaded filter $f_0^{(k'_{switch}-1)}$ is used to further validate the slope sign change by locating the following iteration at which its maximum focus value occurred $$k''_{max} = \underset{l \in [k''_{switch}, k]}{\operatorname{argmax}} F_{BPF}(x_j^{(l)}), \quad (39)$$

where $k''_{switch}$ denotes the first iteration where $f_0^{(k'_{switch}1)}$ was used. The following conditions are then checked:

(i'') If $k''_{max} = k$, the sign change is flagged ambiguous, possibly due to noise, and thus the search is continued to the next iteration (going to Step 1).

(ii") If $k''_{max}=k''_{switch}$, the sign change is flagged validated as it is possible that the search has passed the peak, and thus the search is stopped using $\hat{n}_3^{(k^*)}=n_3^{(k''_{max})}$ as the final in-focus position.

(iii") If $k''_{switch}<k''_{max}<k$, inverse quadratic interpolation is used to determine the final in-focus position using the samples computed with the filter $f_0^{(k'_{switch}-1)}$ at iterations $k''_{max}-1$, $k''_{max}$, and $k''_{max}+1$.

(ii') If $k'_{max}=k$, just as in (i"), the sign change is flagged ambiguous, and the search is continued (going to Step 1).

(iii') If $k'_{switch}<k'_{max}<k$, inverse quadratic interpolation is used to determine the final in-focus position using samples computed with the filter $f_j^{(k)}$ at iterations $k'_{max}-1$, $k'_{max}$, and $k'_{max}+1$.

Stop Condition II: This check is done when the search has reached the end of the search range or if the search continues to move to a position beyond the end of the search range. First, equation (38) is used to determine the iteration at which the maximum focus value occurred for the currently loaded filter $f_j^{(k)}$. The following conditions are then checked to determine the final in-focus position, $\hat{n}_3^{(k^*)}$:

(i') If $k'_{max}=k'_{switch}$, provided that $f_j^{(k)} \geq f_{c,1}$, the history of focus values computed using $f_0^{(k'_{switch}-1)}$ is used to determine $\hat{n}_3^{(k^*)}$ by computing the iteration at which its maximum occurred via equation (39).

(i") If $k''_{max}=k$, the peak is passed and $\hat{n}_3^{(k^*)}=n_3^{(k'_{max})}$ is used as the final in-focus position.

(ii") If $k''_{max}=k''_{switch}$, $\hat{n}_3^{(k^*)}=n_3^{(k''_{max})}$ is used as the final in-focus position.

(iii") If $k''_{switch}<k''_{max}<k$, $\hat{n}_3^{(k^*)}$ is estimated using inverse quadratic interpolation with samples computed from the filter $f_0^{(k'_{switch}-1)}$ at iterations $k''_{max}-1$, $k''_{max}$, and $k''_{max}+1$.

(ii') If $k'_{max}=k$, provided that $f_j^{(k)} \geq f_{c,1}$, the history of focus values computed using $f_0^{(k'_{switch}-1)}$ is used to determine $\hat{n}_3^{(k^*)}$ by computing the iteration at which its maximum occurred via equation (39). If $n_3^{(k''_{is\ max})}$, then $\hat{n}_3^{(k)}=n_3^{(k''_{max})}$, otherwise, $\hat{n}_3^{(k^*)}=n_3^{(k'_{max})}$, where the estimation is made biased towards focusing on an assumed nearest object of interest.

(iii') If $k'_{switch}<k'_{max}<k$, $\hat{n}_3^{(k^*)}$ is estimated using inverse quadratic interpolation with samples computed from the filter $f_j^{(k)}$ at iterations $k'_{max}-1$, $k'_{max}$, and $k'_{max}+1$.

Due to the use of the non-uniform step-sizes of equation (33) during the search, the following general form for inverse quadratic interpolation can be used to determine the final in-focus position using one vector of samples $\rho$, and two vectors of weights, $\xi_1$ and $\xi_2$, $$\hat{n}_3^{(k^*)} = \frac{\frac{1}{2}(\xi_1^T \rho)}{\xi_2^T \rho}, \quad (40)$$

where $$\rho = \begin{bmatrix} F_{BPF}(x_j^{(k_{max}-1)}) \\ F_{BPF}(x_j^{(k_{max})}) \\ F_{BPF}(x_j^{(k_{max}+1)}) \end{bmatrix}, \quad (41)$$

$$\xi_1 = \begin{bmatrix} ((n_3^{(k_{max})})^2 - (n_3^{(k_{max}+1)})^2) \\ ((n_3^{(k_{max}+1)})^2 - (n_3^{(k_{max}-1)})^2) \\ ((n_3^{(k_{max}-1)})^2 - (n_3^{(k_{max})})^2) \end{bmatrix} \quad (42)$$

and $$\xi_2 = \begin{bmatrix} (n_3^{(k_{max})} - n_3^{(k_{max}+1)}) \\ (n_3^{(k_{max}+1)} - n_3^{(k_{max}-1)}) \\ (n_3^{(k_{max}-1)} - n_3^{(k_{max})}) \end{bmatrix} \quad (43)$$

The index $k_{max}$ denotes the iteration at which the maximum sample occurred for the filter slot's samples that are being subjected to interpolation processing.

Figure 11:
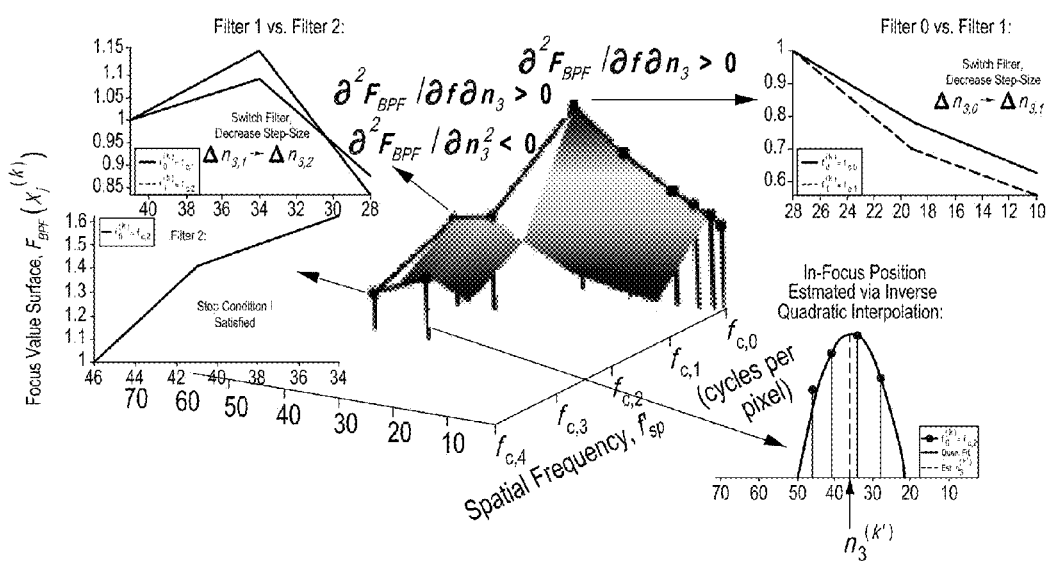
FIG. 11 depicts a graph depicting a Filter-Switching Search schematic in accordance with another embodiment of the present invention.

To obtain a better understanding of the Filter-Switching Search algorithm, a schematic view is provided in FIG. 11. The search can be viewed as a competition between the filters loaded in filter slots 0 and 1. At the start, the digital band-pass filters associated with center-frequencies $f_{c,0}$ and $f_{c,1}$ are loaded in slots 0 and 1, respectively. After obtaining a fully populated state matrix, $\Phi^{(k)}$ the local surface behavior is sampled using the step-size $\Delta n_{3,0}$ until the switch condition is satisfied, at which point, the filter with center frequency $f_{c,1}$ is switched to slot 0 and the filter with center frequency $f_{c,2}$ is loaded into slot 1, and the step-size is decreased to $\Delta n_{3,1}$. In this example, the steeper slope condition is satisfied for switching. The search continues until the switch condition is satisfied again, at that time the filter with center frequency $f_{c,2}$ is switched into slot 0 and the filter with center frequency $f_{c,3}$ is loaded into slot 1 while the step-size is further decreased to $\Delta n_{3,2}$. In this case, both negative curvature and steeper slope switch conditions are satisfied. Once the stopping condition is satisfied, the final in-focus position, $\hat{n}_3^{(k^*)}$, is estimated via inverse quadratic interpolation using the focus value samples and focus actuator positions recorded in the history arrays corresponding to the filter with center frequency $f_{c,2}$.

Figure 12:
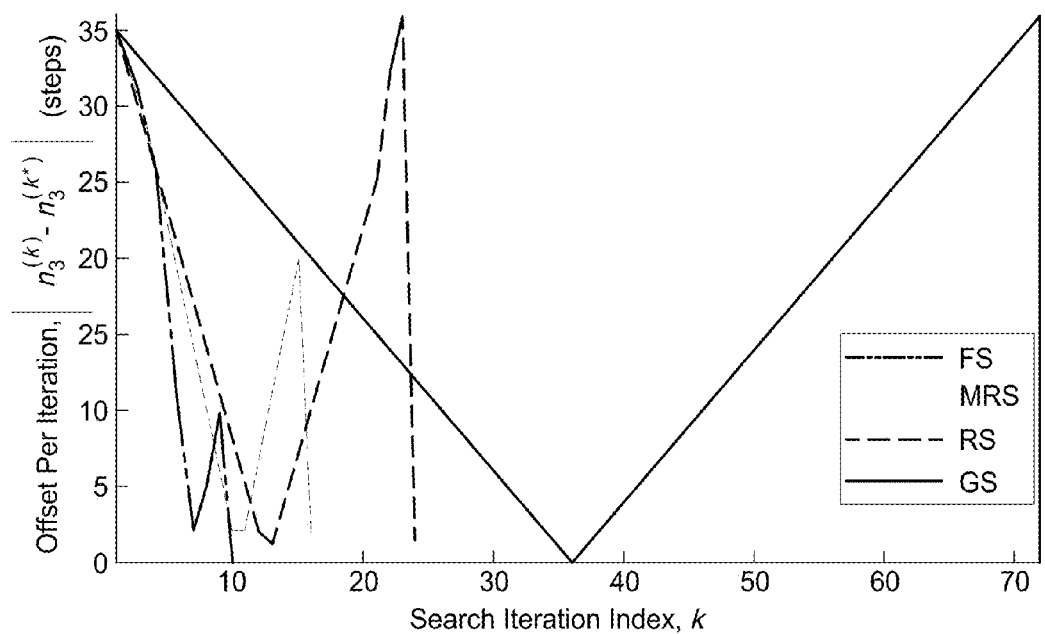
FIG. 12 is a graph depicting a convergence comparison between Global Search (GS), Rulebased Search (RS), Modified RS (MRS), and the Switching Search (FS) in accordance with one embodiment of the present invention.

The convergence comparison of the FS search with the Global Search (GS), Rulebased Search (RS), Modified RS (MRS), and the Switching Search (FS) in accordance with one embodiment of the present invention is illustrated in FIG. 12 for the example in FIG. 11, where it can be seen that FS outperforms GS, RS, and MRS by reducing the number of iterations while maintaining a high level of accuracy. In this case, FS reduces the number of iterations from RS by 58% and from MRS by 37% with a 0 step offset, while both RS and MRS expend more iterations and achieve an offset of 1 and 2 steps, respectively.

The performance of any passive AF search in accordance with the present invention can be characterized by the following four metrics namely, (i) Total Number of Iterations (TNI), (ii) Total Distance Moved (TDM), (iii) Offset From Truth (OFT), and (iv) In-focus Position Overrun (IPO), which are defined as $$TNI = K \quad (44)$$

$$TDM = \sum_{k=0}^{K-2} |n_3^{(k-1)} - n_3^{(k)}| \quad (45)$$

$$OFT = |n_3^{(K-1)} - n_3^{(k^*)}| \quad (46)$$

$$IPO = |n_3^{(K-2)} - n_3^{(k^*)}|, \quad (47)$$

where $n_3^{(k^*)}$ denotes the true in-focus position (normally determined by the GS method), $n_3^{(K-1)}$ denotes the final estimated in-focus position, and $n_3^{(K-2)}$ is the position corresponding to one iteration before moving to the final estimated in-focus position.

TNI gives the amount of iterations required for the search to converge and move to the estimated in-focus position. Thus, it is a measure of AF search speed. TDM gives the amount of steps traveled during the entire search from start to end. This measure can be regarded as a measure of power consumption, noting that larger distances moved require more power consumption by the focus actuator. OFT refers to the residual error of the search algorithm in bringing the object of interest into focus which is defined as the absolute difference between the estimated in-focus position and the GS-found in-focus position. Thus, it is a measure of AF search accuracy. The offset is characterized in terms of the maximum allowable offset of $$\frac{1}{T_3} F_{\#} \varepsilon_{CoC}$$

steps defined by one-half the depth of focus. If the offset is less than the maximum offset, the AF search can be considered to have a high level of in-focus position accuracy.

Finally, IPO provides the amount of steps the search passed the true in-focus position before realizing the peak was passed and then returning to its estimated in-focus position location. This is a measure of user discomfort for a passive AF system, as consumers tend to complain if the passive AF search passes the peak by a noticeable amount before going back to the estimated in-focus position.

The performance of passive AF systems diminishes in low-light and low object contrast levels. Hence, it is important to gauge the robustness of an AF system across all combinations of different lights (1.5K, 640, 300, 160 lux) and object contrast levels (high 100%, mid 75%, low 50%, very low 25%). Since target object contrast is not known a priori, AF performance can be assessed by averaging the above performance measures across these contrast levels. The GS-found in-focus position from the combination of the highest contrast and light level is to be taken as the true in-focus position.

Without limiting the scope of the present invention, various experiments were performed to test various embodiments of the present invention. For example, a controlled experimental setup is recommended as a testing environment such as a darkroom which helps to shield out any unwanted lights and reflections. In the darkroom, custom ISO 12233 test charts of different target object contrast levels [19] can be fixed to a wall at a certain distance from the camera. The chart is then illuminated with two lights on either side of the camera whose lux level can be adjusted using digital control. To allow flexibility in testing, it is recommended to record the draft-preview raw Bayer-pattern sensor data at each focus actuator position, a Bayer-pattern focus sequence, for any AF search simulation analysis.

In order to gauge the effectiveness of the Filter-Switching AF framework, the AF test methodology of the present invention was applied to three different cameras: Camera 1, 2, and 3. Cameras 1 and 2 were prototype DSC type cameras with stepper motor focus actuators while Camera 3 was a prototype cell-phone type camera with a voice-coil focus actuator. Camera 1 had a 3 MPix CCD image sensor paired with a 3× optical zoom lens, while Camera 2 had a 10 MPix CCD image sensor also paired with a 3× optical zoom lens. Camera 3 had a 5 MPix CMOS image sensor and did not have an optical zoom lens. The relevant camera specifications required by the Filter-Switching AF framework are listed in Table I and can be easily determined from the data sheets for any given camera.

TABLE I

CAMERA SPECIFICATIONS FOR THREE TESTED CAMERAS

| | Camera: | | | | |
|---|---|---|---|---|---|
| | 1 | | 2 | | 3 |
| | Wide | Tele | Wide | Tele | Wide |
| $f_F$ (mm) | 6.39 | 18.04 | 7.55 | 21.16 | 4.5 |
| $F_{\#}$ | 2.9 | 3 | 2.84 | 5.27 | 2.8 |
| $T_{1,2}$ (µm) | 2.575 | | 2 | | 1.75 |
| $T_3$ (mm/step) | 0.01 | | 0.01 | | 0.001 |

From the specifications in Table I, the sets of M band-edge frequencies in units of cycles per pixel and step-sizes in units of focus actuator steps were derived using the methodology of Section 2 with $f_{min}$ set to 0.0250 cycles per pixel. In order to determine the best $T_5$ parameter for use in equation (10), an initial test was performed by varying $T_5$. In general, as $T_5$ decreases, M increases and the resulting step-sizes become larger, leading to a faster but less accurate search with larger position overruns. As $T_5$ increases, M decreases as well as the step-sizes, leading to a slower but more accurate search with less position overruns. By examining the 2D joint histogram of OFT and TNI, it was found that $T_5=6$ provided a balance between accuracy and speed across all the camera platforms. The derived M-band filterbank with $T_5=6$ was thus realized using the fourth-order IIR Butterworth digital band-pass filters and used to compute the focus value surface for the Filter-Switching algorithm.

In applying the test methodology of Section 4, the performance of Camera 1 and 2 was examined in both their respective Wide and Tele optical zooms. Camera 1 and 2 were placed at a distance of 1.5 meters from the wall-mounted contrast test chart, while due to the limitations of Camera 3, it was placed within <50 cm from the chart. Draft-preview, raw Bayer-pattern focus sequences were recorded for all the test conditions and then were analyzed to compute the average of the AF performance measures for the GS, RS, MRS, and FS searches as shown in Tables II, III, and IV. Note that only the results for Wide zoom are shown here, although a similar trend was found for Tele zoom. In the case of GS, RS, and MRS, the first difference filter was used to generate the focus value curve during the search as recommended in [3]. Also of note is that in the case of Camera 3, the test focus sequences were taken at every 10 focus actuator steps, reducing its $T_3$ to 0.01 mm/step.

Figures 13A, 13B:
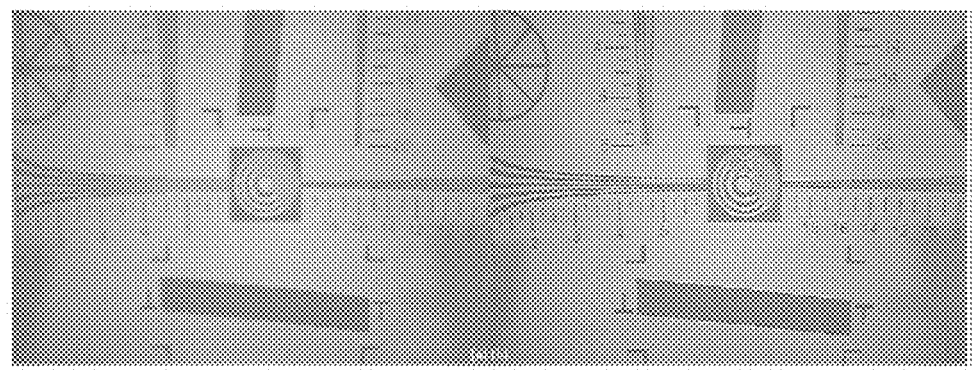
FIGS. 13A and 13B depicts a comparison of offset at the final iteration of FS using interpolated draft preview Bayer raw data for Camera 3 with object contrast of 25% taken at 1.5K lux: (13A) GS with offset of 14 steps, (13B) FS with offset of 1 step.

From the tables, it is evident that the FS search consistently outperformed all the other methods by reducing the total number of iterations, total distance moved, and position overrun while maintaining a high-level of accuracy. Note that OFT for GS is not necessarily zero since the true in-focus position is taken to be the GS position for the combination of the highest contrast and highest lux, and thus can vary for lower contrast and lower lux levels. It is worth emphasizing that the Filter-Switching framework automatically balances the AF speed versus accuracy tradeoff without tedious tuning of hard-to-set thresholds or parameters. While all methods produce offsets below the maximum tolerable offset, FS is able to significantly speed up AF while maintaining a high level of accuracy by taking advantage of the relationship between focus actuator step-size and digital spatial frequency and the differential properties of the resulting focus value surface during the search. A visual comparison of the speed and accuracy of the developed FS search can be seen in FIGS. 13A and 13B. While GS, RS, and MRS are still searching, FS has already converged. It should be noted that the FS in-focus image was obtained with the lowest TNI, TDM and IPO as compared to the other methods.

In addition, in order to test the validity of the derived M band filterbank of Section 2, the performance of the FS search using the derived filterbank was compared with that of using a standard octave-band decomposition by varying M from 3 to 8 and computing the fourth-order IIR Butterworth digital bandpass filterbanks with the following band-edge frequencies for i=0 to M−1: $f_{l,i}=2^{(i-1)\Delta_{OCT}} f_{min}$ and $f_{u,i}=2^{(i)\Delta_{OCT}} f_{min}$, where $$\Delta_{OCT} = \frac{1}{M}\log_2\left(\frac{\frac{1}{2}-f_{min}}{f_{min}}\right).$$

The step-sizes used with each of the filters in the bank were determined using their center frequencies via equation (20). The examination of the 2D joint histograms of OFT and TNI revealed that the FS search algorithm with the devised filterbank achieved the lowest offset and lowest total number of iterations in comparison to arbitrarily derived octave-band filterbanks. In essence, the present invention provides an optimum M-band filterbank which best captures the relevant spatial frequencies for a given set of camera specifications. In other words, there is no need to perform tedious experimentation to determine the best set of filters to use for a given camera as was previously recommended [20].

TABLE II

AF PERFORMANCE: CAMERA I

| Criteria | Method | | | |
|---|---|---|---|---|
| | GS | RS | MRS | FS |
| Offset (max = 4) | 0.8 | 0.9 | 1.6 | 0.4 |
| Iteration | 24 | 11.4 | 8.9 | 5.4 |
| Distance | 39.8 | 39.4 | 23.3 | 18 |
| Overrun | 17 | 17 | 8.9 | 6.7 |

TABLE III

AF PERFORMANCE: CAMERA II

| Criteria | Method | | | |
|---|---|---|---|---|
| | GS | RS | MRS | FS |
| Offset (max = 4) | 0.9 | 1.6 | 0.9 | 1.0 |
| Iteration | 32 | 13 | 17 | 10 |
| Distance | 37.1 | 37.4 | 37.1 | 31.6 |
| Overrun | 8 | 8 | 8 | 5.1 |

TABLE IV

AF PERFORMANCE: CAMERA III

| Criteria | Method | | | |
|---|---|---|---|---|
| | GS | RS | MRS | FS |
| Offset (max = 4) | 0.7 | 0.7 | 0.4 | 1 |
| Iteration | 41 | 23.3 | 16.9 | 9.4 |
| Distance | 56.7 | 56.7 | 40.5 | 30.8 |
| Overrun | 17 | 17 | 9 | 3.9 |

In another example, the results from a real-time search performance comparison for three prototype digital cameras are shown below:

TABLE V

PERFORMANCE COMPARISON: CAMERA 1 (3 Mpix, 3x, step)

| Criteria | Method | | |
|---|---|---|---|
| | % Improvement of MRS over GS | % Improvement of FS over GS | % Improvement of FS over MRS |
| Wide: (22 positions in search domain, offset < 3 steps) | | | |
| Time | 61 | 65 | 10 |
| Iteration | 67 | 73 | 19 |
| Distance | 43 | 50 | 13 |
| Overrun | 49 | 41 | −15 |
| Tele: (72 positions in search domain, offset < 3 steps) | | | |
| Time | 67 | 72 | 15 |
| Iteration | 77 | 84 | 30 |
| Distance | 31 | 57 | 37 |
| Overrun | 42 | 64 | 38 |

TABLE VI

PERFORMANCE COMPARISON: CAMERA 2 (10 Mpix, 3x, step)

| Criteria | Method | | |
|---|---|---|---|
| | % Improvement of MRS over GS | % Improvement of FS over GS | % Improvement of FS over MRS |
| Wide: (32 positions in search domain, offset < 3 steps) | | | |
| Time | 50 | 74 | 48 |
| Iteration | 52 | 75 | 48 |
| Distance | 11 | 32 | 24 |
| Overrun | 24 | 66 | 55 |
| Tele: (143 positions in search domain, offset < 3 steps) | | | |
| Time | 83 | 90 | 38 |
| Iteration | 85 | 91 | 39 |
| Distance | 56 | 69 | 28 |
| Overrun | 77 | 93 | 68 |

TABLE VII

PERFORMANCE COMPARISON: CAMERA 3 (5 Mpix, 1x, VCM)

| Criteria | Method | | |
|---|---|---|---|
| | % Improvement of MRS over GS | % Improvement of FS over GS | % Improvement of FS over MRS |
| Wide: (40 positions in search domain, offset < 4 steps) | | | |
| Time | 60 | 71 | 28 |
| Iteration | 65 | 75 | 30 |
| Distance | 16 | 56 | 47 |
| Overrun | 24 | 82 | 77 |

The FS method outperforms the GS and MRS methods in every relevant performance metric. Moreover, the FS method should provide significant gain in convergence time on any camera platform.

As shown above, the performance results across various cameras exhibit the effectiveness of the present invention. The present invention provides a method of automatically setting the parameters of the passive auto-focusing system used in digital and cell-phone cameras. An auto-focus system model has been presented leading to the design of a set of optimal digital band-pass filters paired with a set of step-size magnitudes. Based on the devised model, the present invention provides a new Filter-Switching Search algorithm which provides a balance between speed and accuracy without the need for carrying out tuning or adjustment of hard-to-set parameters.

REFERENCES

[1] International Imaging Industry Association, "Camera Phone Image Quality Initiative Phase 1 White Paper," October 2007.
[2] K. Sato, "Image-processing algorithms" in Image sensors and signal processing for digital still cameras, J. Nakamua, Ed. Boca Raton, Fla.: Taylor & Francis, 2006.
[3] V. Peddigari, M. Gamadia, and N. Kehtarnavaz, "Real-time implementation issues in passive automatic focusing for digital still cameras," Journal of IS&T, vol. 49, no. 2, pp. 114-123, March/April 2005.
[4] M. Subbarao and J. Tyan, "Selecting the optimal focus measure for autofocusing and depth-from-focus," IEEE Trans. on Pattern Analysis and Machine Intelligence, vol. 20, pp. 864-870, August 1998.
[5] J. Ebbinghaus, "A study of focus measures and search algorithms for passive autofocusing in ir-range cameras," Master's Thesis, Royal Institute of Technology, October 1999.
[6] K.-S. Choi, J.-S. Lee, and S.-J. Ko, "New autofocusing technique using the frequency selective weighted median filter for video cameras," IEEE Trans. on CE, vol. 45, no. 3, pp. 820-827, August 1999.
[7] F. Li and H. Jin, "A fast auto focusing method for digital still camera," in Proc. of the Intl. Conference on Machine Learning and Cybernetics, pp. 5001-5005, August 2005.
[8] E. Krotkov, "Focusing," Intl. Journal of Computer Vision, vol. 1, no. 3, pp. 223-237, October 1987.
[9] C.-M. Chen, C.-M. Hong, and H.-C. Chuang, "Efficient auto-focus algorithm utilizing discrete difference equation prediction model for digital still cameras," IEEE Trans. on CE, vol. 52, no. 4, pp. 1135-1143, November 2006.
[10] K. Kaneda, "Camcorder auto focus design using fuzzy logic," in Proc. of Second Intl. Conf. on Fuzzy Theory and Technology, pp. 107-11, October 1993.
[11] C.-Y. Chen, C.-Y. Tseng, C.-H. Hung, I.-C. Yin, and S.-J. Wang, "Combinational ae-af system with fuzzy climbing search servo," in Proc. of SPIE Conf. on Digital Photography, SPIE vol. 6069, 60690B, February 2006.
[12] N. Kehtarnavaz and H.-J. Oh, "Development and real-time implementation of a rule-based auto-focus algorithm," Journal of Real-Time Imaging, vol. 9, no. 3, pp. 197-203, June 2003.
[13] C. Batten, "Autofocusing and astigmatism correction in the scanning electron microscope," Master's Thesis, University of Cambridge, August 2000.
[14] Y. Yao, B. Abidi, and M. Abidi, "Extreme zoom surveillance: system design and image restoration," Journal of Multimedia, vol. 2, no. 1, pp. 20-31, February 2007.
[15] Y. Yao, B. Abidi, N. Doggaz, and M. Abidi, "Evaluation of sharpness measures and search algorithms for the auto focusing of highmagnification images," in Proc. SPIE Visual Information Processing VX, SPIE vol. 6246, 6246G, May 2006.
[16] J.-S. Lee, Y.-Y. Jung, B.-S. Kim, and S.-J. Ko, "An advanced video camera system with robust af, ae, and awb control," IEEE Trans. on CE, vol. 47, pp. 694-699, August 2001.
[17] H.-C. Lee, Introduction to color imaging science, Cambridge, N.Y.: Cambridge University Press, 2005.
[18] J. G. Proakis and D. G. Manolakis, Digital signal processing: principles, algorithms and applications, Upper Saddle River, N.J.: Prentice-Hall, 1996.
[19] S. Westin, "ISO 12233 test chart," http://www.graphics.cornell.edu/~westin/misc/res-chart.html, accessed October 2008.
[20] M. Gamadia, V. Peddigari, and N. Kehtarnavaz, "Real-time implementation of autofocus on the TI DSC processor," in Proc. SPIE Real-Time Imaging VIII, vol. 5297, pp. 10-18, January 2004.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. An automatic focusing apparatus comprising:
a focusing lens;
a focus actuator connected to the focusing lens to move the focusing lens;
an image sensor aligned with the focusing lens to detect an image through the focusing lens;
j digital band-pass filters connected to the image sensor to extract a set of sharpness samples from a noise-free, blurred, Bayer-pattern sampled image within a focus window from the detected image wherein j>=2;
a memory storing a set of device parameters; and
a processor connected to the focus actuator, the digital band-pass filters and the memory, wherein the processor (a) generates M sets of spatial frequency parameters and M focus actuator step sizes using the set of device parameters wherein M is a number of segments of a spatial frequency axis, and with i=1 (b) loads the i to i+j sets of spatial frequency parameters into the digital band-pass filters (c) obtains a matrix of focus value samples from the digital band-pass filters, (d) controls the focus actuator to sample a local surface behavior using the i focus actuator step size, (e) repeats steps (b) to (d) with i=i+1 whenever a switch condition is satisfied, and (f) estimates a final in-focus position for the image and controls the focusing lens to move to the final in-focus position whenever a stop condition is satisfied.

2. The automatic focusing apparatus as recited in claim 1, wherein the set of device parameters comprises a F-number of the focusing lens ($F_\#$), a pixel sampling period of the image sensor ($T_{1,2}$), and a focus actuator sampling period ($T_3$).

3. The automatic focusing apparatus as recited in claim 1, wherein the processor generates the M sets of spatial frequency parameters and the M focus actuator step sizes by (a) producing a set of spatial frequencies along the spatial frequency axis using the set of device parameters, (b) determines an effective width in focus actuator steps for each spatial frequency using the set of device parameters, (c) segments the spatial frequency axis into a set of candidate band edges using the effective width for each spatial frequency, (d) constructs the M sets of spatial frequency parameters from the set of candidate band edges, and (e) computes the M focus actuator step sizes using the spatial frequency parameters and the set of device parameters.

4. The automatic focusing apparatus as recited in claim 3, wherein the processor further (i) converts the set of spatial frequencies from cycles per pixel to cycles per mm using the set of device parameters, (ii) periodically samples the effective width to create a balance between an auto-focus search speed and an auto-focus accuracy, (iii) rounds the focus actuator steps to a nearest integer, or (iv) merges the candidate band edges to eliminate any narrow bands.

5. The automatic focusing apparatus as recited in claim 1, wherein each set of spatial frequency parameters comprises a lower frequency band edge, an upper frequency band edge, and a center frequency.

6. The automatic focusing apparatus as recited in claim 1, wherein the processor generates the M sets of spatial frequency parameters and the M focus actuator step sizes by:
(a) periodically sampling the spatial frequency axis in an interval $T_4 \leq f_{sp}' \leq \frac{1}{2}$ with a spacing of $T_4$ cycles per pixel between successive samples to produce a set of spatial frequencies $f_{sp}' = n_4 T_4$, for $n_4$ varying from 1 to $N_4-1$, where $N_4 = (2T_4)^{-1}+1$ and $T_4 = T_3$;
(b) converting the set of spatial frequencies $f_{sp}'$ in cycles per pixel to cycles per mm via $$f_{sp} = \frac{f_{sp}'}{T_{1,2}}$$

where $T_{1,2}$ is a pixel sampling period;
(c) deriving the effective width in focus actuator steps for a given spatial frequency $f_{sp}'$ by $$w(n_4) = \frac{2.44 F_\# T_{1,2}}{n_4 T_3 T_4},$$

where $F_\#$ is a F-number of the focusing lens;
(d) for a fixed $n_4$, periodically sample the effective width with a spacing of $$\Delta w(n_4) = \frac{w(n_4)}{T_5}$$

steps in between successive samples, where $T_5$ is an adjustable parameter to create a balance between a search speed and an accuracy;

(e) quantize the focus actuator steps to produce $\Delta w_q(n_4) = Q[\Delta w(n_4)]$, where $Q[.]$ is a round-to-nearest integer operator, and for any $n_4$ where $\Delta w_q(n_4)=0$, $n_4$ is replaced with the next minimum value of $\Delta w_q(n_4)>0$;
(f) use the digital curve of $\Delta w_q(n_4)$ to segment the spatial frequency axis into a set of $E_4$ candidate band edges, $f_{edge}(e_4)$ with $e_4$ indicating a band edge index, using a first-difference operator $\partial_{n_4}[\Delta w_q(n_4)] = \Delta w_q(n_4+1) - \Delta w_q(n_4)$ for $n_4$ varying from 1 to $N_4-2$, and selecting the band edge frequencies with (1) $f_{edge}(0)=f_{min}$, where $f_{min}$ is a minimum spatial frequency considered, (2) $f_{edge}(1)=(n_4-1)T_4$, where $n_4$ is a first sample location where $\partial_{n_4}[\Delta w_q(n_4)]=0$, (3) $f_{edge}(e_4)=(n_4+1)T_4$, where for $e_4$ ranges from 2 to $E_4-2$, where $n_4$ are sample locations where $\partial_{n_4}[\Delta w_q(n_4)]=-1$ with the restriction that $n_4 T_4 > f_{edge}(1)$, and (4) $f_{edge}(E_4-1) = \frac{1}{2} - f_{min}$;
(g) merge the candidate band edges to eliminate narrow bands to avoid over-segmentation of the spatial frequency axis by: (1) if $f_{edge}(E_4-1) - f_{edge}(e_4) > 2T_4$, then an $e_4$th edge is kept, otherwise the $e_4$th edge is removed, and (2) a last edge is always kept to prevent over-segmentation of the highest frequency band if $f_{edge}(E_4-1) - f_{edge}(E_4-2) < 4.5 T_4$, the edge $E_4-2$ is also removed;
(h) from the set of $E_4$ band edges, construct the set of $M = E_4-1$ digital band-pass filter parameters with a lower band edge $f_{l,i} = f_{edge}(i)$, an upper band edge $f_{u,i} = f_{edge}(i+1)$, and a center frequency $f_{c,i} = \frac{1}{2}(f_{u,i} - f_{l,i})$, for $i$ ranging from 0 to $M-1$;
(i) compute a set of step-sizes associated with the ith band by substituting the center frequencies converted into units of cycles per mm via division by $T_{1,2}$ by $$\Delta n_{3,i} = \frac{1}{T_3 T_5}\left(w\left(\frac{f_{c,i}}{T_{1,2}}\right) - w\left(\frac{f_{c,M-1}}{T_{1,2}}\right)\right) + \Delta n_{3,M-1},$$

for $i$ ranging from 0 to $M-2$, and the minimum step-size of $$\Delta n_{3,M-1} = \left\lceil \frac{(F_\# \varepsilon_{CoC})}{2T_3} \right\rceil,$$

which is defined with consideration of the maximum tolerable blur circle diameter $\varepsilon_{CoC}$ where $\varepsilon_{CoC}$ is set to four times the diagonal of a square pixel $\varepsilon_{CoC} = 4 T_{1,2}\sqrt{2}$.

7. The automatic focusing apparatus as recited in claim 1, wherein steps (c) to (e) comprise the following steps for each iteration k:
(a) determine whether the stop condition is satisfied;
(b) update the sample state matrix $\Phi^{(k)}$ with the kth focus value samples as $\Phi^{(k)} = \Phi^{(k-1)} L_3 + [0 [F_{BPF}(x_1^{(k)}) \; F_{BPF}(x_0^{(k)})]^T]$ where $\Phi^{(k)}$ is a 2×3 matrix of samples from a focus value surface, $L_3$ is a 3×3 left-shift matrix with ones on the lower diagonal, 0 is a 2×2 matrix of zeros, $F_{BPF}(x_0^{(k)})$ and $F_{BPF}(x_1^{(k)})$ are the latest focus values computed at step-position $n_3^{(k)}$ using the digital band-pass filter associated with the center spatial frequencies $f_0^{(k)}$ and $f_1^{(k)}$;
(c) normalize the samples in the state matrix $\Phi^{(k)}$ for comparison of the two focus values via $\Phi'^{(k)} = \text{diag}((F_{BPF}(x_1^{(k)}))^-, (F_{BPF}(x_0^{(k)}))^{-1} \Phi^{(k)}$, where $\text{diag}(.)$ indicates a 2×2 diagonal matrix operator;
(d) determine whether a switch condition is not satisfied and repeat steps (a)-(d) for the next iteration k whenever the switch condition is not satisfied;

(e) compute local estimates of the second partial derivatives of the focus value surface expressed as $$\frac{\partial^2 F_{BPF}(x_j^{(k)})}{\partial n_3^2} = s_j^T \Phi^{(k)} \hat{d}_{II}^{(k)} \text{ and } \frac{\partial^2 F_{BPF}(x_j^{(k)})}{\partial f \partial n_3} = \text{trace}(\Phi'^{(k)} (\hat{D}_{II}^{(k)})^T),$$

where $$\hat{d}_{II}^{(k)} = \begin{bmatrix} (\Delta n_3^{(k-1)}(\Delta n_3^{(k)} + \Delta n_3^{(k-1)}))^{-1} - \\ (\Delta n_3^{(k)} \Delta n_3^{(k-1)})^{-1} \\ (\Delta n_3^{(k)}(\Delta n_3^{(k)} + \Delta n_3^{(k-1)}))^{-1} \end{bmatrix}$$

and $$\hat{D}_{II}^{(k)} = (2\Delta n_3^{(k-1)})^{-1} \times \begin{bmatrix} -1 & (1 - \Delta n_3^{(k-1)}(\Delta n_3^{(k)})^{-1}) & 0 \\ 1 & -(1 - \Delta n_3^{(k-1)}(\Delta n_3^{(k)})^{-1}) & 0 \end{bmatrix}$$

are the estimates of the second partial derivatives, and $s_j^T$ is a selection vector used to switch amongst the values from on digital band-pass filter to another digital band-pass filter;

(f) compute the switch condition using $$k_{match} = \begin{cases} k & \left(\frac{\partial^2 F_{BPF}(x_j^{(k)})}{\partial n_3^2} < 0\right) \vee \left(\frac{\partial^2 F_{BPF}(x_j^{(k)})}{\partial f \partial n_3^2} > 0\right), \\ k_{switch} & \text{other} \end{cases}$$

where switch $k_{switch}$ denotes the iteration at which the switch condition is satisfied, the first condition $$\left(\frac{\partial^2 F_{BPF}(x_j^{(k)})}{\partial n_3^2} < 0\right)$$

is a check for negative curvature along the focus actuator movement direction and the second condition $$\left(\frac{\partial^2 F_{BPF}(x_j^{(k)})}{\partial f \partial n_3} > 0\right)$$

compares estimates of the slopes of the two focus value curves under analysis;

(g) compute the switch matrix $S^{(k+1)}$ for the next iteration $$S^{(k+1)} = \begin{cases} S^{(k)} U_M & (k = k_{switch}) \wedge (f_o^{(k)} \neq f_{c,M-2}) \\ S^{(k)} & \text{other} \end{cases}$$

where $S^{(k+1)}$ is a 2×M matrix which is initialized to $$S^{(0)} = \begin{bmatrix} 0 & 1 & \dots & 0 \\ 1 & 0 & \dots & 0 \end{bmatrix}$$

at the beginning of the search and $U_M$ is an M×M upper-shift matrix with ones on the superdiagonal;

(h) compute the analysis filters to be used at the next iteration as $f^{(k=1)} = S^{(k+1)} f_c$ where $f_c = [f_{c,0} \ f_{c,0} \ \dots \ f_{c,M-1}]^T$ is the vector of M spatial center frequencies, and $f^{(k)}$ denotes the vector whose elements are the center spatial frequencies for the two filters loaded into filter slots 0 and 1: $f^{(k)} = [f_1^{(k)} \ f_0^{(k)}]^T$;

(i) update sample state matrix if the switch condition is satisfied as indicated $$\Phi^{(k)} = \begin{cases} L_2 \Phi^{(k)} + \begin{bmatrix} 0 \begin{bmatrix} F_{BPF}(x_1^{(k+1)}) \\ 0 \end{bmatrix} \end{bmatrix} & (k = k_{switch}) \wedge (f_o^{(k)} \neq f_{c,M-2}) \\ \Phi^{(k)} & \text{other,} \end{cases}$$

where $L_2$ is a 2×2 down-shift operator with ones on the lower diagonal;

(j) update the step-size $$\Delta n_3^{(k+1)} = \begin{cases} s_j^T S^{(k+1)} \Delta n_3 & (k = k_{switch}) \\ \Delta n_3^{(k)} + 1 & (k \neq k_{switch}) \wedge (\Delta n_3^{(k)} \neq \Delta n_{3,M-1}) \\ \Delta n_3^{(k)} & \text{other,} \end{cases}$$

where $\Delta n_3$ denotes the vector of M step-sizes, $\Delta n_3 = [\Delta n_{3,0} \ \Delta n_{3,1} \ \dots \ \Delta n_{3,M-1}]^T$ and the vector $s_j^T$ denotes the filter slot selection vector where $$j = \begin{cases} 0 & (k = k_{switch}) \wedge (f_0^{(k)} = f_{c,M-2}) \\ 1 & \text{other} \end{cases}$$

is the index of the active filter slot, and $s_0 = [1 \ 0]^T$, $s_1 = [0 \ 1]^T$;

(k) update the focus actuator position to $n_3^{(k+1)} = n_3^{(k)} + \Delta n_3^{(k+1)}$; and (l) determine whether the stop condition is satisfied.

8. The automatic focusing apparatus as recited in claim 1, wherein the switch condition comprises an indication of a slope sign change.

9. The automatic focusing apparatus as recited in claim 1, wherein the switch condition comprises:

(a) if $\Phi'^{(k)}$ is fully populated, then compute an estimate of the following first partial derivative along the focus actuator direction for the filter slot determined by $s_j^T$, $$\left(\frac{\partial^2 F_{BPF}(x_j^{(k)})}{\partial n_3}\right) = s_j^T \Phi'^{(k)} \hat{d}_I^{(k)},$$

where $\hat{d}_I^{(k)}$ is an estimate of the first derivative formed by taking the average of two backward finite differences as given by $$\hat{d}_I^{(k)} = 2^{-1} \begin{bmatrix} -(\Delta n_3^{(k-1)})^{-1} \\ (\Delta n_3^{(k)} - \Delta n_3^{(k-1)})(\Delta n_3^{(k)} \Delta n_3^{(k-1)})^{-1} \\ (\Delta n_3^{(k)})^{-1} \end{bmatrix};$$

(b) if there is an indication of a slope sign change as given by $$\left(\left(\frac{\partial \Delta F_{BPF}(x_j^{(k)})}{\partial n_3}\right) < 0\right) \wedge \left(\left(\frac{\partial \Delta F_{BPF}(x_j^{(k-1)})}{\partial n_3}\right) > 0\right),$$

then determine whether to continue or end the search by validating the sign change, the iteration at which the maximum focus value occurred for the currently loaded filter is first obtained from the following optimization $$k'_{max} = \underset{l \in [k'_{switch}, k]}{\operatorname{argmax}} F_{BPF}(x_j^{(l)}),$$

where $k'_{switch}$ denotes the iteration in which filter $f_j^{(k)}$ was first loaded and the following conditions are then checked:
(1) if $k'_{max} = k'_{switch}$, provided that $f_j^{(k)} \geq f_{c,1}$, the history of focus values from the previously loaded filter $f_0^{(k'_{switch}-1)}$ is used to further validate the slope sign change by locating the following iteration at which its maximum focus value occurred $$k''_{max} = \underset{l \in [k''_{switch}, k]}{\operatorname{argmax}} F_{BPF}(x_j^{(l)}),$$

where $k''_{switch}$ denotes the first iteration where $f_0^{(k'_{switch}-1)}$ was used and the following conditions are then checked:
 (i) if $k''_{max} = k$, the sign change is flagged ambiguous, and the search is continued to the next iteration;
 (ii) if $k''_{max} = k''_{switch}$, the sign change is flagged validated and the search is stopped using $\hat{n}_3^{(k^*)} = n_3^{(k''_{max})}$ as the final in-focus position;
 (iii) If $k''_{switch} < k''_{max} < k$, inverse quadratic interpolation is used to determine the final in-focus position using the samples computed with the filter $f_0^{(k'_{switch}-1)}$ at iterations $k''_{max}-1$, $k''_{max}$, and $k''_{max}+1$;
(2) if $k'_{max} = k$, the search is continued; and
(3) if $k'_{switch} < k'_{max} < k$, inverse quadratic interpolation is used to determine the final in-focus position using samples computed with the filter $f_j^{(k)}$ at iterations $k'_{max}-1$, $k'_{max}$, and $k'_{max}+1$.

10. The automatic focusing apparatus as recited in claim 1, wherein the stop condition comprises either an end of a search range has been reached or the search moved to a position beyond the end of the search range.

11. The automatic focusing apparatus as recited in claim 1, wherein the stop condition comprises:

$$k'_{max} = \underset{l \in [k'_{switch}, k]}{\operatorname{argmax}} F_{BPF}(x_j^{(l)})$$

is used to determine the iteration at which the maximum focus value occurred for the currently loaded filter $f_j^{(k)}$ and the following conditions are checked to determine the final in-focus position, $\hat{n}_3^{(k^*)}$:
(1) if $k'_{max} = k'_{switch}$, provided that $f_j^{(k)} \geq f_{c,1}$, the history of focus values computed using $f_0^{(k'_{switch}-1)}$ is used to determine $\hat{n}_3^{(k^*)}$ by computing the iteration at which its maximum occurred via (39);

(i) if $k''_{max} = k$, the peak is passed and $\hat{n}_3^{(k^*)} = n_3^{(k'_{max})}$ is used as the final in-focus position;
 (ii) if $k''_{max} = k''_{switch}$, $\hat{n}_3^{(k^*)} = n_3^{(k''_{max})}$ is used as the final in-focus position;
 (iii) if $k''_{switch} < k''_{max} < k$, $\hat{n}_3^{(k^*)}$ is estimated using inverse quadratic interpolation with samples computed from the filter $f_0^{(k'_{switch}-1)}$ at iterations $k''_{max}-1$, $k''_{max}$, and $k''_{max}+1$;
(2) if $k'_{max} = k$, provided that $f_j^{(k)} \geq f_{c,1}$, the history of focus values computed using $f_0^{(k'_{switch}-1)}$ is used to determine $\hat{n}_3^{(k^*)}$ by computing the iteration at which its maximum occurred, and if $n_3^{(k''_{max})} < n_3^{(k'_{max})}$, then $\hat{n}_3^{(k^*)} = n_3^{(k''_{max})}$, otherwise, $\hat{n}_3^{(k^*)} = n_3^{(k'_{max})}$, where the estimation is made biased towards focusing on an assumed nearest object of interest; and
(3) if $k'_{switch} < k'_{max} < k$, $\hat{n}_3^{(k^*)}$ is estimated using inverse quadratic interpolation with samples computed from the filter $f_j^{(k)}$ at iterations $k'_{max}-1$, $k'_{max}$, and $k'_{max}+1$.

12. The automatic focusing apparatus as recited in claim 1, wherein the final in-focus position is estimated via an inverse quadratic interpolation using the focus value samples and the focus actuator positions corresponding to the digital band-pass filter loaded with the i set of spatial frequency parameters.

13. The automatic focusing apparatus as recited in claim 1, wherein the final in-focus position ($\hat{n}_3^{(k^*)}$) is estimated by $$\hat{n}_3^{(k^*)} = \frac{\frac{1}{2}(\xi_1^T \rho)}{\xi_2^T \rho},$$

where:

$$\rho = \begin{bmatrix} F_{BPF}(x_j^{(k_{max}-1)}) \\ F_{BPF}(x_j^{(k_{max})}) \\ F_{BPF}(x_j^{(k_{max}+1)}) \end{bmatrix},$$

$$\xi_1 = \begin{bmatrix} \left((n_3^{(k_{max})})^2 - (n_3^{(k_{max}+1)})^2\right) \\ \left((n_3^{(k_{max}+1)})^2 - (n_3^{(k_{max}-1)})^2\right) \\ \left((n_3^{(k_{max}-1)})^2 - (n_3^{(k_{max})})^2\right) \end{bmatrix},$$

$$\xi_2 = \begin{bmatrix} \left(n_3^{(k_{max})} - n_3^{(k_{max}+1)}\right) \\ \left(n_3^{(k_{max}+1)} - n_3^{(k_{max}-1)}\right) \\ \left(n_3^{(k_{max}-1)} - n_3^{(k_{max})}\right) \end{bmatrix},$$

$F_{BPF}(x_j^{(k)})$ is the focus value,
j is the digital band-pass filter,
$k_{max}$ denotes an iteration at which a maximum sample occurred for the filter slot's samples that are being subjected to interpolation processing, and
$n_3^{(k)}$ is the focus actuator position for iteration k.

14. The automatic focusing apparatus as recited in claim 1, wherein the automatic focusing apparatus is integrated into a digital camera, a cell-phone camera, a computer, a personal data assistant, a mobile communication device, a hand-held device, or a vehicle.

15. A method for automatically focusing a focusing lens using j digital band-pass filters wherein $j \geq 2$, the method comprising the steps of:
(a) generating M sets of spatial frequency parameters and M focus actuator step sizes using a set of device parameters wherein M is a number of segments of a spatial frequency axis, and with i=1;

(b) loading the i to j sets of spatial frequency parameters into the digital band-pass filters;

(c) obtaining a matrix of focus value samples from the digital band-pass filters;

(d) controlling the focusing lens to sample a local surface behavior using the i focus actuator step size;

(e) repeating steps (b) to (d) with i=i+1 whenever a switch condition is satisfied; and (f) estimating a final in-focus position for the image and controlling the focusing lens to move to the final in-focus position whenever a stop condition is satisfied.

16. The method as recited in claim 15, wherein the set of device parameters comprises a F-number of the focusing lens ($F_{\#}$), a pixel sampling period of the image sensor ($T_{1,2}$), and a focus actuator sampling period ($T_3$).

17. The method as recited in claim 15, wherein the step of generating the M sets of spatial frequency parameters and the M focus actuator step sizes comprises the steps of:

(a) producing a set of spatial frequencies along the spatial frequency axis using the set of device parameters;

(b) determining an effective width in focus actuator steps for each spatial frequency using the set of device parameters, (c) segmenting the spatial frequency axis into a set of candidate band edges using the effective width for each spatial frequency, (d) constructing the M sets of spatial frequency parameters from the set of candidate band edges, and (e) computing the M focus actuator step sizes using the spatial frequency parameters and the set of device parameters.

18. The method as recited in claim 17, further comprising the steps of:

converting the set of spatial frequencies from cycles per pixel to cycles per mm using the set of device parameters;

periodically sampling the effective width to create a balance between an auto-focus search speed and an auto-focus accuracy; or rounding the focus actuator steps to a nearest integer, or (iv) merges the candidate band edges to eliminate any narrow bands.

19. The method as recited in claim 15, wherein each set of spatial frequency parameters comprises a lower frequency band edge, an upper frequency band edge, and a center frequency.

20. The method as recited in claim 15, wherein the switch condition comprises an indication of a slope sign change.

21. The method as recited in claim 15, wherein the stop condition comprises either an end of a search range has been reached or the search moved to a position beyond the end of the search range.

22. The method as recited in claim 15, wherein the final in-focus position is estimated via an inverse quadratic interpolation using the focus value samples and the focus actuator positions corresponding to the digital band-pass filter loaded with the i set of spatial frequency parameters.

23. The method as recited in claim 15, wherein the final in-focus position ($\hat{n}_3^{(k^*)}$) is estimated by $$\hat{n}_3^{(k^*)} = \frac{\frac{1}{2}(\xi_1^T \rho)}{\xi_2^T \rho},$$

-continued where:

$$\rho = \begin{bmatrix} F_{BPF}(x_j^{(k_{max}-1)}) \\ F_{BPF}(x_j^{(k_{max})}) \\ F_{BPF}(x_j^{(k_{max}+1)}) \end{bmatrix},$$

$$\xi_1 = \begin{bmatrix} ((n_3^{(k_{max})})^2 - (n_3^{(k_{max}+1)})^2) \\ ((n_3^{(k_{max}+1)})^2 - (n_3^{(k_{max}-1)})^2) \\ ((n_3^{(k_{max}-1)})^2 - (n_3^{(k_{max})})^2) \end{bmatrix},$$

$$\xi_2 = \begin{bmatrix} (n_3^{(k_{max})} - n_3^{(k_{max}+1)}) \\ (n_3^{(k_{max}+1)} - n_3^{(k_{max}-1)}) \\ (n_3^{(k_{max}-1)} - n_3^{(k_{max})}) \end{bmatrix},$$

$F_{BPF}(x_j^{(k)})$ is the focus value, j is the digital band-pass filter, $k_{max}$ denotes an iteration at which a maximum sample occurred for the filter slot's samples that are being subjected to interpolation processing, and $n_3^{(k)}$ is the focus actuator position for iteration k.

24. A non-transitory computer readable medium encoded with a computer program for execution by a processor for automatically focusing a focusing lens using j digital band-pass filters wherein j>=2, the computer program comprising:

(a) a code segment for generating M sets of spatial frequency parameters and M focus actuator step sizes using a set of device parameters wherein M is a number of segments of a spatial frequency axis, and with i=1;

(b) a code segment for loading the i to i+j sets of spatial frequency parameters into the digital band-pass filters;

(c) a code segment for obtaining a matrix of focus value samples from the digital band-pass filters;

(d) a code segment for controlling the focusing lens to sample a local surface behavior using the i focus actuator step size;

(e) a code segment for repeating steps (b) to (d) with i=i+1 whenever a switch condition is satisfied; and (f) a code segment for estimating a final in-focus position for the image and controlling the focusing lens to move to the final in-focus position whenever a stop condition is satisfied.

25. The non-transitory computer readable medium as recited in claim 24, wherein the set of device parameters comprises a F-number of the focusing lens ($F_{\#}$), a pixel sampling period of the image sensor ($T_{1,2}$), and a focus actuator sampling period ($T_3$).

26. The non-transitory computer readable medium as recited in claim 24, wherein the code segment for generating the M sets of spatial frequency parameters and the M focus actuator step sizes comprises:

(a) a code segment for producing a set of spatial frequencies along the spatial frequency axis using the set of device parameters;

(b) a code segment for determining an effective width in focus actuator steps for each spatial frequency using the set of device parameters, (c) a code segment for segmenting the spatial frequency axis into a set of candidate band edges using the effective width for each spatial frequency, (d) a code segment for constructing the M sets of spatial frequency parameters from the set of candidate band edges, and (e) a code segment for computing the M focus actuator step sizes using the spatial frequency parameters and the set of device parameters.

27. The non-transitory computer readable medium as recited in claim 26, further comprising:
a code segment for converting the set of spatial frequencies from cycles per pixel to cycles per mm using the set of device parameters;
a code segment for periodically sampling the effective width to create a balance between an auto-focus search speed and an auto-focus accuracy; or
a code segment for rounding the focus actuator steps to a nearest integer, or (iv) merges the candidate band edges to eliminate any narrow bands.

28. The non-transitory computer readable medium as recited in claim 24, wherein each set of spatial frequency parameters comprises a lower frequency band edge, an upper frequency band edge, and a center frequency.

29. The non-transitory computer readable medium as recited in claim 24, wherein the switch condition comprises an indication of a slope sign change.

30. The non-transitory computer readable medium as recited in claim 24, wherein the stop condition comprises either an end of a search range has been reached or the search moved to a position beyond the end of the search range.

31. The non-transitory computer readable medium as recited in claim 24, wherein the final in-focus position is estimated via an inverse quadratic interpolation using the focus value samples and the focus actuator positions corresponding to the digital band-pass filter loaded with the i set of spatial frequency parameters.

32. An automatic focusing apparatus comprising:
a focusing lens;
a focus actuator connected to the focusing lens to move the focusing lens;
an image sensor aligned with the focusing lens to detect an image through the focusing lens;
a first and a second digital band-pass filter connected to the image sensor to extract a set of sharpness samples from a noise-free, blurred, Bayer-pattern sampled image within a focus window from the detected image;
a memory storing a set of device parameters; and
a processor connected to the focus actuator, the digital band-pass filters and the memory, wherein the processor (a) generates M sets of spatial frequency parameters and M focus actuator step sizes using the set of device parameters wherein M is a number of segments of a spatial frequency axis, (b) loads the first and second sets of spatial frequency parameters into the first and second digital band-pass filters, respectively, (c) initializes an iteration k, (d) estimates a final in-focus position and controls the focusing lens to move to the final in-focus position whenever a stop condition is satisfied, (e) whenever the stop condition is not satisfied: (1) updates a sample state matrix with the kth focus value samples, (2) normalizes the samples in the state matrix for comparison of the focus values, (3) starts a next iteration and repeats steps (1)-(3) whenever a switch condition is not satisfied, (4) whenever the switch condition is satisfied, (5) computes local estimates of the second partial derivatives of the focus value surface and computes the switch condition, (6) computes the switch matrix to be used in the next iteration, (7) computes the analysis filters to be used at the next iteration, (8) updates the sample state matrix if the switch condition is satisfied, (9) updates the step size and updating the focus actuator position, and (10) repeats steps (d)-(e) until the final in-focus position is estimated.

33. A method for automatically focusing a focusing lens using a first and a second digital band-pass filter, the method comprising the steps of:
(a) generating M sets of spatial frequency parameters and M focus actuator step sizes using a set of device parameters wherein M is a number of segments of a spatial frequency axis, and with i=1;
(b) loading the first and second sets of spatial frequency parameters into the first and second digital band-pass filters, respectively;
(c) initializing an iteration k;
(d) estimating a final in-focus position and controlling the focusing lens to move to the final in-focus position whenever a stop condition is satisfied;
(e) whenever the stop condition is not satisfied: (1) updating a sample state matrix with the kth focus value samples, (2) normalizing the samples in the state matrix for comparison of the focus values, (3) starting a next iteration and repeating steps (1)-(3) whenever a switch condition is not satisfied, (4) whenever the switch condition is satisfied, (5) computing local estimates of the second partial derivatives of the focus value surface and computing the switch condition, (6) computing the switch matrix to be used in the next iteration, (7) computing the analysis filters to be used at the next iteration, (8) updating the sample state matrix if the switch condition is satisfied, (9) updating the step size and updating the focus actuator position, and (10) repeating steps (d)-(e) until the final in-focus position is estimated.

34. A non-transitory computer readable medium encoded with a computer program for execution by a processor for automatically focusing a focusing lens using j digital band-pass filters wherein j>=2, the computer program comprising:
(a) a code segment for generating M sets of spatial frequency parameters and M focus actuator step sizes using a set of device parameters wherein M is a number of segments of a spatial frequency axis, and with i=1;
(b) a code segment for loading the first and second sets of spatial frequency parameters into the first and second digital band-pass filters, respectively;
(c) a code segment for initializing an iteration k;
(d) a code segment for estimating a final in-focus position and controlling the focusing lens to move to the final in-focus position whenever a stop condition is satisfied;
(e) a code segment for whenever the stop condition is not satisfied: (1) updating a sample state matrix with the kth focus value samples, (2) normalizing the samples in the state matrix for comparison of the focus values, (3) starting a next iteration and repeating steps (1)-(3) whenever a switch condition is not satisfied, (4) whenever the switch condition is satisfied, (5) computing local estimates of the second partial derivatives of the focus value surface and computing the switch condition, (6) computing the switch matrix to be used in the next iteration, (7) computing the analysis filters to be used at the next iteration, (8) updating the sample state matrix if the switch condition is satisfied, (9) updating the step size and updating the focus actuator position, and (10) repeating steps (d)-(e) until the final in-focus position is estimated.

* * * * *